United States Patent
Park et al.

(10) Patent No.: US 11,257,482 B2
(45) Date of Patent: Feb. 22, 2022

(54) ELECTRONIC DEVICE AND CONTROL METHOD

(71) Applicant: SAMSUNG ELECTRONICS CO., LTD., Suwon-si (KR)

(72) Inventors: Chan-jong Park, Seoul (KR); Ji-man Kim, Suwon-si (KR); Do-jun Yang, Yongin-si (KR); Hyun-woo Lee, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 168 days.

(21) Appl. No.: 16/477,978

(22) PCT Filed: Jan. 22, 2018

(86) PCT No.: PCT/KR2018/000947
§ 371 (c)(1),
(2) Date: Jul. 15, 2019

(87) PCT Pub. No.: WO2018/174397
PCT Pub. Date: Sep. 27, 2018

(65) Prior Publication Data
US 2019/0371300 A1 Dec. 5, 2019

(30) Foreign Application Priority Data

Mar. 20, 2017 (KR) .......... 10-2017-0034600
Sep. 28, 2017 (KR) .......... 10-2017-0125802

(51) Int. Cl.
*G10L 15/08* (2006.01)
*G06F 16/31* (2019.01)
(Continued)

(52) U.S. Cl.
CPC .......... *G10L 15/08* (2013.01); *G06F 16/316* (2019.01); *G06F 16/61* (2019.01); *G10L 15/005* (2013.01); *G10L 15/01* (2013.01); *G10L 15/26* (2013.01)

(58) Field of Classification Search
CPC .... G06F 16/248; G06F 16/903; G06F 16/334; G06F 16/90335; G06F 16/9038;
(Continued)

(56) References Cited

U.S. PATENT DOCUMENTS 7,295,969 B1   11/2007  Nakatsuyama
9,560,206 B2 *  1/2017  Jones ................. H04M 3/56
(Continued)

FOREIGN PATENT DOCUMENTS

GB   2 451 938 A   2/2009
JP   2014-519071 A   8/2014
(Continued)

OTHER PUBLICATIONS

Dogan Can et al., "Lattice Indexing for Spoken Term Detection", IEEE Transactions on Audio, Speech, and Language Processing, vol. 19, No. 8, IEEE, XP011380545, Nov. 1, 2011, pp. 2338-2347.
(Continued)

*Primary Examiner* — Linda Wong
(74) *Attorney, Agent, or Firm* — Sughrue Mion, PLLC

(57) ABSTRACT

Disclosed are an artificial intelligence (AI) system using a machine learning algorithm such as deep learning, and an application thereof. The present disclosure provides an electronic device comprising: an input unit for receiving content data; a memory for storing information on the content data; an audio output unit for outputting the content data; and a processor, which acquires a plurality of data keywords by analyzing the inputted content data, matches and stores time stamps, of the content data, respectively corresponding to
(Continued)

the plurality of acquired keywords, based on a user command being inputted, searches for a data keyword corresponding to the inputted user command among the stored data keywords, and plays the content data based on the time stamp corresponding to the searched data keyword.

13 Claims, 18 Drawing Sheets

(51) Int. Cl.
  *G06F 16/61*    (2019.01)
  *G10L 15/00*    (2013.01)
  *G10L 15/01*    (2013.01)
  *G10L 15/26*    (2006.01)

(58) Field of Classification Search
  CPC ........... G06F 16/3344; G06F 16/90332; G06F 16/2428; G06F 40/30; G06F 16/24; G06F 16/3329; G06F 16/3331; G06F 16/3334; G06F 16/3338; G06F 40/20; G10L 15/22; G10L 2015/088; G10L 2015/223; G10L 15/02; G10L 15/08; G10L 15/1815; G10L 15/183; G10L 2015/225; G10L 2015/226
  See application file for complete search history.

(56) References Cited

U.S. PATENT DOCUMENTS

| | | | |
|---|---|---|---|
| 10,304,441 B2 | 5/2019 | Ji | |
| 2010/0014828 A1* | 1/2010 | Sandstrom | G11B 27/105 386/244 |
| 2014/0372401 A1 | 12/2014 | Goldstein et al. | |
| 2016/0063115 A1* | 3/2016 | Ayan | G06F 16/9535 707/722 |
| 2016/0078083 A1 | 3/2016 | Han et al. | |
| 2016/0171100 A1* | 6/2016 | Fujita | G06F 16/24578 707/722 |
| 2016/0328104 A1* | 11/2016 | Chandra | G06F 16/44 |
| 2016/0342639 A1* | 11/2016 | Ignjatic | G06F 16/258 |
| 2017/0060997 A1 | 3/2017 | Lee et al. | |
| 2017/0147576 A1* | 5/2017 | Des Jardins | G06F 16/48 |
| 2018/0006837 A1* | 1/2018 | Cartwright | H04N 7/147 |

FOREIGN PATENT DOCUMENTS

| | | | |
|---|---|---|---|
| KR | 10-2011-0037115 A | | 4/2011 |
| KR | 10-2011-0053397 A | | 5/2011 |
| KR | 101489876 B1 | * | 2/2015 |
| KR | 10-2015-0052600 A | | 5/2015 |
| KR | 10-1545050 B1 | | 8/2015 |
| KR | 10-1567154 B1 | | 11/2015 |
| KR | 10-1590078 B1 | | 2/2016 |
| WO | 2015/167074 A1 | | 11/2015 |

OTHER PUBLICATIONS

Communication dated Nov. 8, 2019, issued by the European Patent Office in counterpart European Application No. 18772526.2.
International Search Report (PCT/ISA/210) dated May 30, 2018 issued by the International Searching Authority in International Application No. PCT/KR2018/000947.
Written Opinion (PCT/ISA/237) dated May 30, 2018 issued by the International Searching Authority in International Application No. PCT/KR2018/000947.
Communication dated Sep. 9, 2021 by the European Patent Office in counterpart European Patent Application No. 18772526.2.

* cited by examiner

ELECTRONIC DEVICE AND CONTROL METHOD

TECHNICAL FIELD

The present disclosure relates to an electronic device and a control method. More particularly, the disclosure relates to an electronic device analyzing contents of content data and playing a specific part of the content data desired by a user, and a control method.

Further, the disclosure relates to an artificial intelligence (AI) system simulating functions such as cognition, determination and the like, of a human brain using a machine learning algorithm, and an application thereof.

BACKGROUND ART

The artificial intelligence (AI) system is a computer system which implements intelligence of a human level, which is a system in which a machine learns, determines and gets smart by itself, unlike an existing rules-based smart system. A recognition rate of the artificial intelligence (AI) system can be improved as it is used more and more and user preferences can be more accurately understood and thus, the existing rules-based smart system has been gradually replaced with a deep learning-based artificial intelligence system.

The artificial intelligence (AI) technology includes machine learning (deep learning), and element technology using the machine learning.

The machine learning is an algorithm technology to classify and learn features of input data by itself. The element technology is a technology to utilize a machine learning algorithm such as deep learning and the like, which includes technical fields including linguistic understanding, visual understanding, inference/prediction, knowledge expression, motion control and the like.

Various fields to which the artificial intelligence (AI) technology is applied are shown below. Linguistic understanding is a technology of recognizing languages and characters of human, and applying and processing the recognized human languages and characters, which may include natural language processing, machine translation, dialogue system, question and answer, voice recognition and synthesis, etc. The visual understanding is a technique to recognize an object as if the object were viewed from a human sight, which may include object recognition, object tracking, image search, human recognition, scene understanding, space understanding, image improvement and the like. The inference and prediction is a technique of identifying information to perform logical inference and prediction, which may include knowledge/probability-based inference, optimization prediction, preference-based planning, recommendation, etc. The knowledge expression is a technique of performing automatic processing of human experience information as knowledge data, which may include knowledge construction (data generation/classification), knowledge management (data utilization), etc. The motion control is a technique of controlling autonomous driving of a vehicle and a robot motion, which may include a motion control (navigation, collision and driving), manipulation control (behavior control), etc.

Meanwhile, with the advancement of technology, a miniaturized recording device with improved performance is being developed. As the recording device is popularized, it is becoming more common to record at various places and to play the recorded data later. For example, when a user who took a one-hour lecture ten times records a lecture, a total of ten hours of lecture data may be recorded. The user may desire to listen again to a specific topic in the lecture. However, over time, it is difficult for the user to know in which part of the entire lecture data a specific topic to be listened to again is recorded.

Accordingly, when a specific topic the user desires to listen by using an artificial intelligence technology, there is a demand for a technology to play content data of a part matching the user utterance.

DETAILED DESCRIPTION OF INVENTION

Technical Problem

The disclosure is to provide an electronic device analyzing content data, and playing a specific part of content data matching with a user utterance, and a control method.

Solution Means to Problem

An electronic device according to an aspect of the disclosure to achieve the objective as described above includes an input unit for receiving content data, a memory for storing information on the content data, an audio output unit for outputting the content data, and a processor, which acquires a plurality of data keywords by analyzing the inputted content data, matches and stores time stamps, of the content data, respectively corresponding to the plurality of acquired keywords, based on a user command being inputted, searches for a data keyword corresponding to the inputted user command among the stored data keywords, and plays the content data based on the time stamp corresponding to the searched data keyword.

In addition, the processor may assign a weight to the data keyword on the basis of at least one of a context of the content data or a frequency of the data keyword.

In addition, the processor may analyze the inputted user command and acquire a command keyword, assign a weight to the acquired command keyword, identify the data keyword matched with the command keyword, calculate a score on the basis of a weight of the identified data keyword and a weight of the command keyword, search for a data keyword having the highest score on the basis of the calculated score, and play the content data based on the time stamp corresponding to the searched data keyword.

Meanwhile, the data keyword may include a domain keyword and a sub keyword.

In addition, the domain keyword may include a main topic word of sentences included in the content data.

In addition, the sub keyword may include at least one of a similar word of the domain keyword, a related word of the domain keyword, and a word included in another sentence related to the domain keyword.

Meanwhile, the electronic device may further include a display for displaying a structure of the content data in a visualization chart on the basis of the domain keyword and the sub keyword.

In addition, the processor may, if a selection command with respect to a data keyword included in the visualization chart is inputted, play the content data on the basis of a time stamp corresponding to the selected data keyword.

A control method of an electronic device according to an aspect of the disclosure to achieve the objective as described above includes receiving and storing content data, analyzing the inputted content data so as to acquire a plurality of data keywords, matching and storing time stamps, of the content data, respectively corresponding to the plurality of acquired keywords, based on a user command being inputted, searching for a data keyword corresponding to the inputted user command among the stored data keywords, and playing the content data based on the time stamp corresponding to the searched data keyword.

In addition, the control method of the electronic device may further include assigning a weight to the data keyword on the basis of at least one of a context of the content data or a frequency of the data keyword.

Meanwhile, the searching for the data keyword may include analyzing the inputted user command and acquiring a command keyword, assigning a weight to the acquired command keyword, identifying the data keyword matched with the command keyword, calculating a score on the basis of a weight of the identified data keyword and a weight of the command keyword, searching for a data keyword having the highest score on the basis of the calculated score, and playing the content data based on the time stamp corresponding to the searched data keyword.

Meanwhile, the data keyword may include a domain keyword and a sub keyword.

In addition, the domain keyword may include a main topic word of sentences included in the content data.

In addition, the sub keyword may include at least one of a similar word of the domain keyword, a related word of the domain keyword, and a word included in another sentence related to the domain keyword.

Meanwhile, the control method of the electronic device may further include displaying a structure of the content data in a visualization chart on the basis of the domain keyword and the sub keyword.

In addition, the playing the content data may include, if a selection command with respect to a data keyword included in the visualization chart is inputted, playing the content data on the basis of a time stamp corresponding to the selected data keyword.

Effect of Invention

According to the various embodiments described above, in an electronic device and a control method, a specific part of content data matching with a user utterance may be played, thereby easily searching for a specific part of a content desired by the user.

BEST MODE FOR CARRYING OUT THE INVENTION

Modes for Carrying Out the Invention

Hereinafter, preferred embodiments of the disclosure will be described in greater detail with reference to the accompanying drawings. For reference, when it is determined that the detailed description of the known function or configuration may obscure the gist of the embodiments in describing them, the detailed description thereof will be omitted. Terms used hereinafter are terms defined by functions of the disclosure being considered, and definitions may vary according to a user, an operator or a custom. Thus, the definition of the terms should be made in consideration of the overall contents of the disclosure.

The terms such as "first" and "second" may be used to describe various elements, but the elements should not be limited by these terms. The terms are used simply to distinguish one element from other elements. For example, the 'first' component may be named the 'second' component, and vice versa, without departing from the scope of the disclosure. The term of "and/or" includes combination of a plurality of related item of one of the plurality of related items.

Terms used in the present specification are used only in order to describe specific embodiments rather than limiting and/or restricting the disclosure. The singular forms are intended to include the plural forms as well, unless the context clearly indicates otherwise. The terms "include" or "comprise" are used the description to indicate that there are features, numbers, operations, elements, parts or combination thereof, and they should not exclude the possibilities of combination or addition of one or more features, numbers, operations, elements, parts or combination thereof.

In an embodiment, 'a module' or 'a unit' may perform at least one function or operation and may be implemented to be hardware, software or combination of hardware and software. In addition, a plurality of 'modules' or 'units' may be integrated into at least one module and may be realized as at least one processor in an integrated manner except for 'modules' or 'units' that should be realized in specific hardware.

Hereinafter, the disclosure will be described in detail with reference to the accompanying drawings.

Figure 1:
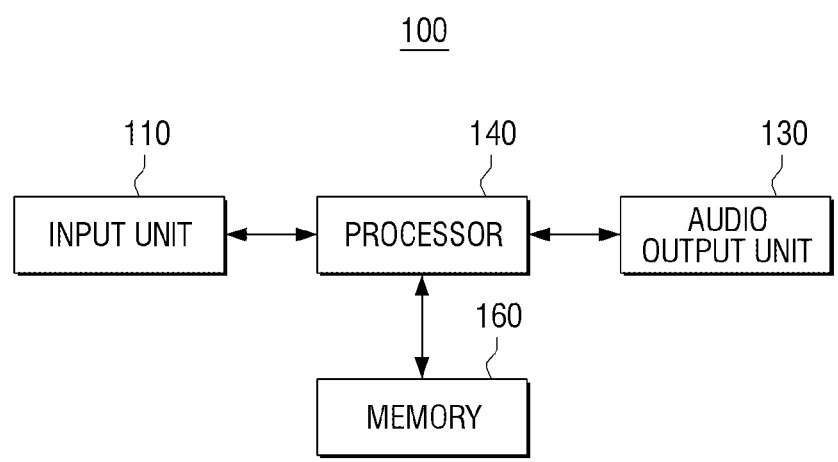
FIG. 1 illustrates a block diagram of an electronic device, according to an embodiment of the disclosure.

FIG. 1 illustrates a block diagram of an electronic device, according to an embodiment of the disclosure. Referring to FIG. 1, an electronic device 100 may solely provide an intelligent retrieval system. As another example, the electronic device 100 may be interlocked with a server and provide the intelligent retrieval system to a user.

The term "an intelligent retrieval" used herein refers to a software application that combines artificial intelligence technology and speech recognition technology to understand a user's language and recognizing a specific part of content desired by the user and playing the recognized specific part. For example, the intelligent retrieval service may perform an artificial intelligent function such as machine learning, speech recognition, and context awareness including deep learning. The intelligent retrieval service may learn the customs or patterns of users and provide personalized services for the individuals.

The electronic device 100 may be a mobile device such as a smart phone or a tablet personal computer (PC), but it is merely an example. The electronic device 100 may be implemented as various apparatuses which can record or store and play content, such as a recording device, a voice recognition device, a wearable device, a hub of a home network, an electronic frame, a humanoid robot, an audio device, and the like.

Referring to FIG. 1, the electronic device 100 may include an input unit 110, an audio output unit 130, a processor and a memory 160.

The input unit 110 receives input of content data. For example, the content data may be audio data. The input unit 110 may receive input of audio data uttered by a speaker in a lecture or a meeting. That is, the input unit 110 may receive input of a user speech. In an embodiment, the input unit 100 may be a microphone.

The memory 160 stores information on content data. First, content data inputted to the input unit 110 may be stored in the memory 160. When the content data is audio data, the inputted content data may be recorded in the memory 160. In addition, the memory 160 may store programs, data and the like, to perform various functions of the electronic device 100.

For example, the memory 160 may include storage media, such as flash memory, hard disk, SSD, SDD, multimedia card, RAM, ROM, EEPROM, USB memory and the like. Meanwhile, the electronic device 100 may be operated in connection with a web storage performing a storage function of the memory 160 on the Internet.

The processor 140 analyzes the inputted content data and acquires a plurality of data keywords. For example, the processor 140 may analyze recorded content data and summarize the main content. That is, the processor 140 may proceed with the context analysis of the content data. The processor 140 may convert the recorded content to text, and proceed with the context analysis of the content data based on the converted text. The context analysis may be performed based on an artificial intelligent function such as machine learning, sentence analysis and context awareness including deep learning. The processor 140 acquires a plurality of keywords through the context analysis.

In addition, the processor 140 matches and stores time stamps, of the content data, respectively corresponding to the plurality of acquired keywords. For example, when the content data is a lecture on history, background, technical theory, etc. of machine learning, the processor 120 may acquire keywords such as machine learning, history, background and technical theory, and generate a time stamp of a point corresponding to each of the acquired keywords. The processor 140 matches and stores time stamps corresponding to the acquired keywords.

For example, it is assumed that the duration of a first lecture of machine learning is 1 hour, where from the 15th minute to the 21st minute of the whole lecture is on the history of machine learning, from the 21st minute to the 27th minute of the whole lecture is on the background of machine learning, and from the 27th minute to the 34th minute of the whole lecture is on the basic theory of machine learning. The processor 140 may extract keywords such as machine learning, history, background and technical theory, and generate time stamps of 15 minute, 21 minute and 27 minute. In addition, the processor 140 may connect keywords of history, background, basic theory with a first lecture of machine learning, connect a time stamp of 15 minute with history, connect a time stamp of 21 minute with background, and connect a time stamp of 27 minute with basic theory.

The user may retrieve a specific part of the recorded lecture content by speech.

The processor 140, based on a user command being inputted, searches for a data keyword corresponding to the inputted user command among the stored data keywords. In addition, the processor 140 plays the content data based on the time stamp corresponding to the searched data keyword.

For example, the user may utter a command to the electronic device 100 with a voice of machine learning and history. The input unit 110 may receive input of the uttered user command. The processor 140 may analyze and recognize the inputted user command. The processor 140 may search for a keyword corresponding to the recognized machine learning and the recognized history. In addition, the processor 140 play from the 15th minute point of the first lecture of machine learning based on the time stamp of 15 minute matched with the searched-for keyword, the history of the machine learning.

The audio output unit 130 outputs content data. That is, in the example described above, the audio output unit 130 may output lecture data of the 15th minute point of the first lecture of machine learning. For example, the audio output unit 130 may be a speaker.

According to the embodiment described above, the electronic device 100 may analyze the inputted content data and store the analyzed content data along with a keyword and a time stamp on the basis of artificial intelligence functions such as machine learning, speech recognition, sentence analysis and context awareness including deep learning. In addition, the electronic device 100 can provide the user with the convenience of searching by performing an intelligent retrieval to search for and output content data of a corresponding time stamp point according to a user command.

Figure 2:
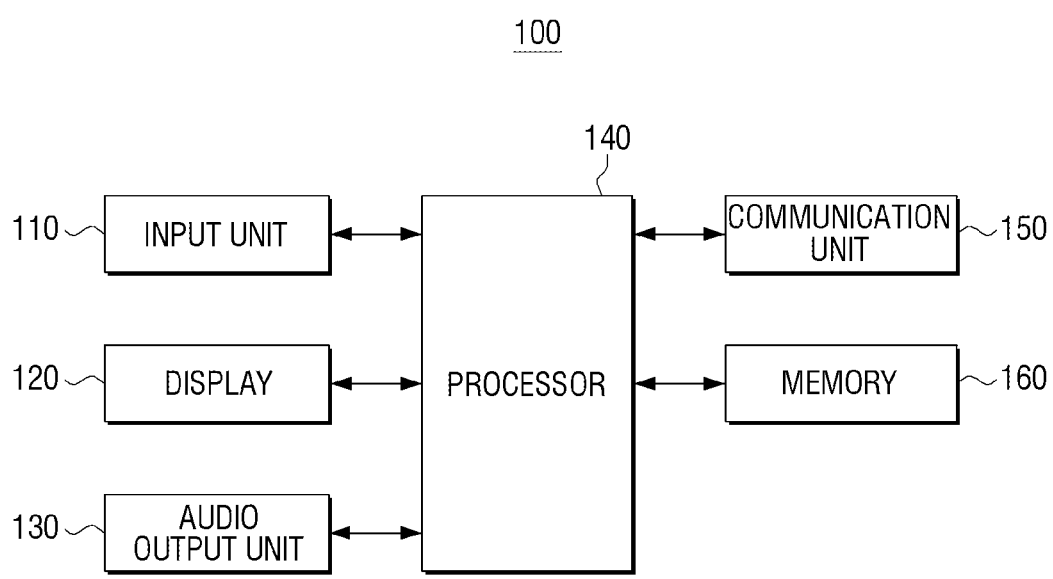
FIG. 2 is a block diagram provided to explain a detailed configuration of an electronic device, according to an embodiment of the disclosure.

FIG. 2 is a block diagram provided to explain a detailed configuration of an electronic device, according to an embodiment of the disclosure.

Referring to FIG. 2, the electronic device 100 may include an input unit 110, a display 120, an audio output unit 130, a processor 140, a communication unit 150, and a memory 160. Further to the elements illustrated in the embodiment of FIG. 2, the electronic device 100 may include various elements such as an image reception unit (not illustrated), an image processing unit (not illustrated), a power supply unit (not illustrated), a wired interface (not illustrated) and the like. In addition, the electronic device 100 is not necessarily implemented to include all elements illustrated in FIG. 2.

The input unit 110 receives input of content data. In an embodiment, the input unit 100 may be a microphone. The microphone is implemented in various forms and performs a function of receiving input of a user speech. The microphone may include various acoustic filters to remove noise.

Meanwhile, the input unit 110 may be implemented as a button, a motion recognition device, a touch pad, and the like. If the input unit 110 is implemented as a touch pad, it may be implemented in the form of a touch screen having a mutual layer structure in combination with the display 120. The touch screen may detect a position, area, pressure, etc. of a touch input.

The display 120 may display various image contents, information, UIs, etc. provided by the electronic device 100. For example, the display 120 may display a response information providing screen corresponding to a user speech. The display 120 may be implemented as a liquid crystal display (LCD), an organic light emitting display (OLED), a plasma display panel (PDP) or the like, and display various screens that can be provided through the electronic device 100.

The display 120 may display a visualization diagram corresponding to the keywords of the content data. For example, the processor 140 may generate a structure of the content data on the basis of domain keywords and sub keywords of the content data. In addition, the display 120 may display the generated content data structure in a visualization diagram to correspond to a user command. For example, a domain keyword may be a key keyword of sentences or paragraphs of the content data. Alternatively, the domain keyword may be a main topic word of sentences included in the content data. A sub keyword may include a word used in a similar environment to a domain keyword, a word in the context in which a domain keyword is used, a word related to the meaning of a domain keyword, a synonym of a domain keyword, a word related to a domain keyword, a word included in another sentence related to a domain keyword, or the like. The display 120 may display content data information, etc. that corresponds to a user command inputted by the user or a searched-for part.

The audio output unit 130 may output audio. The audio output unit 130 may output not only various audio data but also notification sounds or voice messages. The electronic device 100 according to an embodiment of the disclosure may include a speaker as one of output units to play the searched-for content data. Through the speaker, the electronic device 100 may output the content data searched for by the intelligent retrieval function to the user. The speaker may be built in the electronic device 100 or may be implemented in the form of an output port such as a jack and the like.

The communication unit 150 performs communication with an external device. For example, the external device may be implemented as a server, a cloud storage, a network, or the like. The communication unit 150 may transmit a speech recognition result to the external device and receive the corresponding information from the external device. The communication unit 150 may receive a language model for speech recognition from an external device.

To this end, the communication unit 150 may include a variety of communication modules such as a near-field wireless communication module (not illustrated) and a wireless communication module (not illustrated). Herein, the near-field wireless communication module refers to the module which communicates with an external device located nearly, according to a near-field wireless communication method such as Bluetooth, Zigbee and the like. In addition, the wireless communication module refers to the module which is connected to an external network according to a wireless communication protocol such as Wi-Fi, Wi-Fi direct, IEEE and the like, and performs a communication. In addition, the wireless communication module may further include a mobile communication module which is connected to a mobile communication network according to various mobile communication standards such as 3G, 3GPP, LTE, and LTE-A to perform communications.

The memory 160 may store various modules, software and data for driving the electronic device 100. For example, an acoustic model and language model that can be used to recognize a user speech, and a context model that can be used to extract context and keywords of content data may be stored in the memory 160. In addition, an information ontology (or a task network) for determining a candidate operation based on a user input may be stored in the memory 160. In addition, a domain keyword and sub keyword extracted from the content data, and a time stamp corresponding to the keywords may be stored in the memory 160.

The memory 160 is a storage medium in which various programs necessary for operating the electronic device 100, etc. are stored, which may be implemented in the form of a flash memory, a hard disk drive (HDD), a solid state drive (SSD) and the like.

For example, the storage 160 may include a ROM which stores programs to operate the electronic device 100 and a RAM which temporarily stores data according to operation execution of the electronic device 100. The memory 160 may store programs and data for configuring various screens to be displayed on the display 120. In addition, the memory 240 may store programs, applications and data for performing a specific service.

The processor 140 may analyze the inputted content data and acquire a plurality of data keywords. A data keyword includes a domain keyword and a sub keyword. The processor 140 may acquire a plurality of domain keywords and a plurality of sub keywords. The processor 140 may match time stamps of content data respectively corresponding to the plurality of acquired keywords, and store them in the memory 160. In addition, the processor 140 may, when a user command is inputted, recognize the inputted user command. For example, the user command may be a voice command. That is, the processor 140 may recognize a user voice using an acoustic model and language model stored in the memory 160. In addition, the processor 140 may extract a keyword using a context model stored in the memory 160.

The processor 140 may search for a data keyword corresponding to the recognized user command among the stored data keywords. The processor 140 may play the content data based on the time stamp corresponding to the searched data keyword.

More specific tasks will be described again below.

Figure 3:
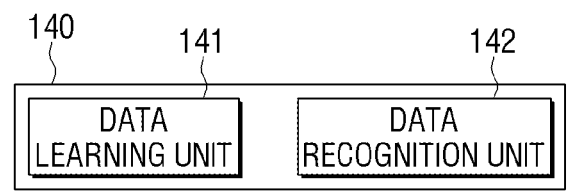
FIG. 3 is a block diagram of a processor, according to some embodiments of the disclosure.

FIG. 3 is a block diagram of a processor, according to some embodiments of the disclosure.

Referring to FIG. 3, the processor 140 according to some embodiments may include at least one of a data learning unit 141 and a data recognition unit 142.

The data learning unit 141 may learn criteria for content data analysis, data keyword extraction, speech recognition and language understanding. Specifically, the data learning unit 141 may learn keyword extraction criteria for extracting a data keyword from content data. In addition, the data learning unit 141 may learn the keyword extraction criteria according to whether or not an extracted keyword is utilized. That is, the data learning unit 141 may generate, learn or update new keyword extraction criteria based on keyword extraction reference data and learning data.

Here, the data learning unit 141 may learn the keyword extraction criteria so as to extract different keywords depending on the type of content data. For example, the data learning unit 141 may learn keyword extraction criteria for extracting repeated keywords when there is one user in the content data. Alternatively, the data learning unit 141 may learn keyword extraction criteria for extracting a keyword commonly uttered by a plurality of users when there are a plurality of users in the content data.

The processor 140 may analyze the content data according to the learned criteria and determine main data keywords, and analyze the inputted user speech and determine intent of the user utterance. In addition, the processor 140 may extract an appropriate data keyword corresponding to the content data. The data learning unit 141 may determine what data is to be used in order to analyze the content data and to recognize the user speech. The data learning unit 141 may acquire data to be used for learning, and apply the acquired data to a data recognition model which will be described later, thereby learning criteria for content data analysis, data keyword extraction and speech recognition.

The data recognition unit 142 may recognize context from predetermined data using the learned data recognition model. The data recognition unit 142 may acquire predetermined data according to predetermined criteria by learning, and use the data recognition model with the acquired data as an input value. For example, the data recognition unit 142 may analyze the inputted content data and extract a data keyword using the learned context model and the like. In addition, the data recognition unit 142 may recognize the inputted user speech using the learned acoustic model and the language model. In addition, based on the recognized user speech, the data recognition unit 142 may determine what action to perform from the user's utterance.

The data recognition unit 142 may update the data recognition model with the inputted content data and the extracted data keyword as an input value again. In addition, the data recognition unit 142 may update the data recognition model by using the data acquired as a result of the speech recognition of each user and the candidate task determination as the input value again. As described above, the data recognition unit 142 may utilize big data for content data analysis, data keyword extraction, speech recognition, executable task determination and the like. The processor 140 may utilize an information ontology learned with big data.

At least a part of the data learning unit 141 and at least a part of the data recognition unit 142 may be implemented as a software module or manufactured in the form of at least one hardware chip and mounted on an electronic device. For example, at least one of the data learning unit 141 and the data recognition unit 142 may be manufactured in the form of a hardware chip exclusive for artificial intelligence (AI) or may be manufactured as a part of an existing general purpose processor (for example, a CPU or application processor) or a graphics exclusive processor (for example, a GPU) and mounted on the various electronic devices described above or a content data playback device. Here, the hardware chip exclusive for artificial intelligence is an exclusive processor specialized for probability calculation, which shows high parallel processing performance as compared with the existing general purpose processor. Thus, calculation operations in the artificial intelligence field such as machine learning may be processed quickly. When the data learning unit 141 and the data recognition unit 142 are implemented as a software module (or a program module including instructions), the software module may be stored in non-transitory computer readable media. In this case, the software module may be provided by an operating system (OS) or a predetermined application. Alternatively, a part of the software module may be provided by the operating system (OS) and the remaining part may be provided by the predetermined application.

According to an embodiment of FIG. 3, both the data learning unit 141 and the data recognition unit 142 are mounted on the electronic device 100, but they may be mounted on a separate device, respectively. For example, one of the data learning unit 141 and the data recognition unit 142 may be included in the electronic device 100, and the remaining one may be included in the server 200. In addition, the data learning unit 141 and the data recognition unit 142 may be connected to each other via wire or wirelessly and model information constructed by the data learning unit 141 may be provided to the data recognition unit 142, and data inputted to the data recognition unit 142 may be provided to the data learning unit 141 as additional learning data.

Figure 4A:
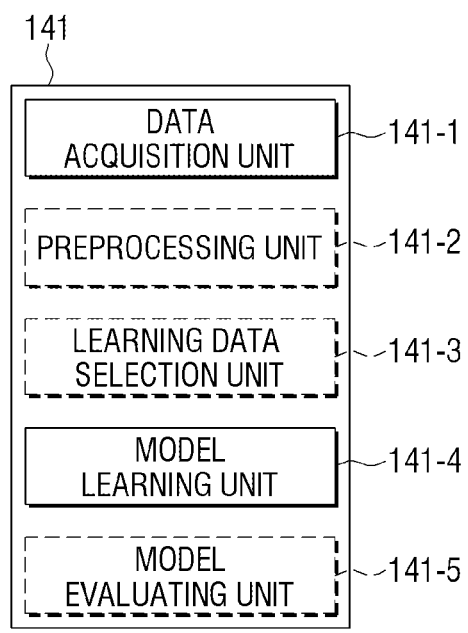
FIG. 4A is a block diagram of a data learning unit, according to some embodiments of the disclosure.

FIG. 4A is a block diagram of the data learning unit 141, according to some embodiments of the disclosure.

Referring to FIG. 4A, the data recognition unit 141 according to some embodiments may include a data acquisition unit 141-1 and a model learning unit 141-4. In addition, the data learning unit 141 may further selectively include at least one of a preprocessing unit 141-2, a learning data selection unit 141-3 and a model evaluating unit 141-5.

The data acquisition unit 141-1 may acquire data necessary to determine context. For example, the data acquisition unit 141-1 may acquire audio data by converting content data or user voice signal inputted through the input unit 110 into a digital signal. In addition, the data acquisition unit 141-1 may receive learning audio data from the server 200 or a network such as the Internet.

The model learning unit 131-4 may learn criteria for determining context based on the learning data. In addition, the model learning unit 131-4 may learn criteria for which learning data to use in order to determine context.

For example, the model learning unit 141-4 may learn the physical characteristics that distinguish phonemes, syllables, vowels, etc. by comparing a plurality of audio data. Through the above, the model learning unit 141-4 may establish an acoustic model (AM) for classifying sound units such as phonemes. In addition, the model learning unit 141-4 may learn word or lexical usage by comparing a plurality of audio data. Through the above, the model learning unit 141-4 may establish a language model (LM).

As another example, the model learning unit 141-4 may establish information ontology that may determine an executable operation based on a recognized user speech.

In addition, the model learning unit 141-4 may learn syllables, syntactic words, words, word classes, etc. from the content data, and learn context between sentences or paragraphs. The model learning unit 141-4 may establish a context model through learning. In addition, the model learning unit 141-4 may extract a keyword from the content data, and establish ontology using the extracted keyword.

The model learning unit 141-4 may learn a data recognition model used for determining context using the learning data. In this case, the data recognition model may be a pre-established model. For example, the data recognition model may be a model which is established in advance by receiving basic learning data (for example, sample content data, sample audio data, etc.). As another example, the data recognition model may be an acoustic model (AM) or a language model (LM) which is established in advance using big data.

The data recognition model may be established in consideration of an application field of the recognition model, an objective of learning, computer performance of the device and the like. The data recognition model may be, for example, a model based on a neural network. For example, models such as Deep Neural Network (DNN), Recurrent Neural Network (RNN) and Bidirectional Recurrent Deep Neural Network (BRDNN) may be used as a data recognition model, but is not limited thereto.

According to various embodiments, if there are a plurality of pre-established data recognition models, the model learning unit 141-4 may determine a data recognition model with high relevancy between inputted learning data and basic learning data as a data recognition model to learn. In this case, the basic learning data may be pre-classified by data type, and the data recognition model may be pre-established by data type. For example, the basic learning data may be pre-classified by various criteria, such as an area where the learning data is generated, a time at which the learning data is generated, a size of the learning data, a genre of the learning data, a generator of the learning data, a type of object within the learning data or the like.

In addition, the model learning unit 141-4, for example, may learn a data recognition model using a learning algorithm including an error back-propagation method or a gradient descent method, etc.

For example, the model learning unit 141-4 may learn a data recognition model through supervised learning using learning data as an input value. As another example, the model learning unit 141-4 may learn a data recognition model through unsupervised learning which finds criteria for determining context by learning the type of data for determining context without further guidance. As another example, the model learning unit 141-4 may learn a data recognition model through reinforcement learning which uses feedback on whether the result of the context determination according to learning is correct.

Further, when the data recognition model is learned, the model learning unit 141-4 may store the learned data recognition model. In this case, the model learning unit 141-4 may store the learned data recognition model in the memory 160 of the electronic device 100. Alternatively, the model training unit 141-4 may store the learned data recognition model in a memory of the server 200 which is connected to the electronic device 10 via a wired or wireless network.

In this case, the memory 160 in which the learned data recognition model is stored may store a command or data related to at least one other element of the electronic device 100 together. In addition, the memory 160 may store software and/or programs. For example, the programs may include a kernel, a middleware, an application programming interface (API) and/or an application program (or "application"), etc.

The data learning unit 141 may further include the preprocessing unit 141-2 and the learning data selection unit 141-3 in order to improve a result of the data recognition model or to save resources or time necessary to generate the data recognition model.

The preprocessing unit 141-2 may pre-process the acquired data so that the acquired data can be used for learning to determine context. The preprocessing unit 141-2 may pre-process acquired data so that the acquired data can be used for learning for determining context.

For example, the preprocessing unit 141-2 may acquire some sections of the inputted content data or a section to be recognized with respect to an inputted user voice. In addition, the preprocessing unit 141-2 may generate audio data by removing noise, extracting features, etc.

As another example, the preprocessing unit 141-2 may intensify some frequency elements by analyzing the frequency elements of the inputted content data or the inputted user voice, and generate audio data to be suitable for voice recognition in a manner of suppressing the remaining frequency elements. Alternatively, the preprocessing unit 141-2 may convert the inputted voice content data into text content data.

The learning data selection unit 141-3 may select data required for learning from among the preprocessed data. The selected data may be provided to the model learning unit 141-4. The learning data selection unit 141-3 may select data necessary for learning from among the preprocessed data according to predetermined criteria for determining context. In addition, the learning data selection unit 141-3 may select data according to predetermined criteria by learning of the model learning unit 141-4.

For example, at the beginning of learning, the learning data selection unit 141-3 may divide the preprocessed context data in units of syllables or remove postpositions, etc. Alternatively, the learning data selection unit 141-3 may remove audio data having high similarity among the preprocessed audio data. In other words, for the initial learning, the learning data selection unit 141-3 may select data to learn criteria which is easy to distinguish.

As another example, the learning data selection unit 141-3 may select only audio data which includes a specific part of speech such as noun or the like. The learning data selection unit 141-3 may select only data corresponding to specific context. By selecting data of a specific part of speech or specific context, the learning data selection unit 141-3 may allow the model learning unit 141-4 to learn criteria suitable for the selected specific part of speech or the specific context.

Alternatively, the learning data selection unit 141-3 may select only audio data which is uttered in a specific language. As utterance characteristics vary depending on languages, the learning data selection unit 141-3 may allow the model learning unit 141-4 to learn criteria suitable for the selected specific language by selecting a set of audio data which is uttered in the specific language.

On the contrary, the learning data selection unit 141-3 may select data where of several parts of speech or several contexts. Through the above, the model learning unit 141-4 may learn criteria for what part of speech or context the context includes. In addition, the learning data selection unit 141-3 may select audio data where characteristics of each language are reflected. Through the above, the model learning unit 141-4 may learn criteria for which language the audio data corresponds to.

Meanwhile, the learning data selection unit 141-3 may allow the model learning unit 141-4 to learn criteria for speaker dependent recognition or speaker adoption recognition by selecting only audio data of a specific user.

In addition, the data learning selection unit 141-3 may select preprocessed audio data which commonly satisfies one of predetermined criteria by learning. Through the above, the model learning unit 141-4 may learn criteria different from the criteria which are already learned.

The data learning part 141 may further include the model evaluating unit 141-5 in order to improve an output result of the data recognition model.

The model evaluating unit 141-5 may input evaluation data to a data recognition model, and if the recognition result outputted from the evaluation data does not satisfy predetermined criteria, allow the model learning unit 141-4 to learn again. In this case, the evaluation data may be predetermined data for evaluating the data recognition model.

In the initial recognition model construction stage, the evaluation data may be audio data including phonemes with different physical characteristics. Alternatively, the evaluation data may be data with different words, context or the like. Subsequently, the evaluation data may be replaced by an audio data set or a data set of which degree of similarity gradually becomes consistent. Through the above, the model evaluating unit 141-5 may gradually verify the performance of the data recognition model.

For example, if the number or the ratio of the evaluation data whose recognition result is not accurate among the recognition results of the learned data recognition model for the evaluation data exceeds a predetermined threshold value, the model evaluating unit 141-5 may evaluate that predetermined criteria are not satisfied. For example, when the predetermined criteria are defined as a ratio of 2%, when the learned data recognition model outputs an incorrect recognition result for evaluation data exceeding 20 out of a total of 1000 evaluation data, the model evaluating unit 141-5 may evaluate that the learned data recognition model is not suitable.

On the other hand, when there are a plurality of learned data recognition models, the model evaluating unit 141-5 may evaluate whether each of the learned moving image recognition models satisfies the predetermined criteria and determine the model which satisfies the predetermined criteria as the final data recognition model. In this case, when there are a plurality of models satisfying the predetermined criteria, the model evaluating unit 141-5 may determine any one or a predetermined number of models previously set in descending order of the evaluation score as the final data recognition model.

Meanwhile, at least one of the data acquisition unit 141-1, the preprocessing unit 141-2, the learning data selection unit 141-3, the model learning unit 141-4, and the model evaluating unit 141-5 in the data learning unit 141 may be manufactured in the form of a hardware chip and mounted on an electronic device. For example, at least one of the data acquisition unit 141-1, the preprocessing unit 141-2, the learning data selection unit 141-3, the model learning unit 141-4, and the model updating unit 141-5 may be manufactured in the form of a chip exclusively used for hardware for artificial intelligence (AI), in the form of the existing universal processor (for example, CPU or application processor), or as part of IP for a specific function to be mounted on the above-described various electronic devices 100.

The data acquisition unit 141-1, the preprocessing unit 141-2, the learning data selection unit 141-3, the model learning unit 141-4, and the model evaluating unit 141-5 may be mounted on a single electronic device or on separate electronic devices, respectively. For example, some of the data acquisition unit 141-1, the preprocessing unit 141-2, the learning data selection unit 141-3, the model learning unit 141-4, and the model evaluating unit 141-5 may be included in the electronic device 100, and the rest may be included in the server 200.

Meanwhile, at least one of the data acquisition unit 141-1, the preprocessing unit 141-2, the learning data selection unit 141-3, the model learning unit 141-4, and the model evaluating unit 141-5 may be implemented as a software module. If at least one of the data acquisition unit 141-1, the preprocessing unit 141-2, the learning data selection unit 141-3, the model learning unit 141-4, and the model evaluating unit 141-5 is implemented as a software module (or a program module including instructions), the software module may be stored in a non-transitory computer readable recording medium. At least one software module may be provided by an operating system (OS) or a predetermined application. Alternatively, part of at least one software module may be provided by an OS, and the remaining part may be provided by a predetermined application.

Figure 4B:
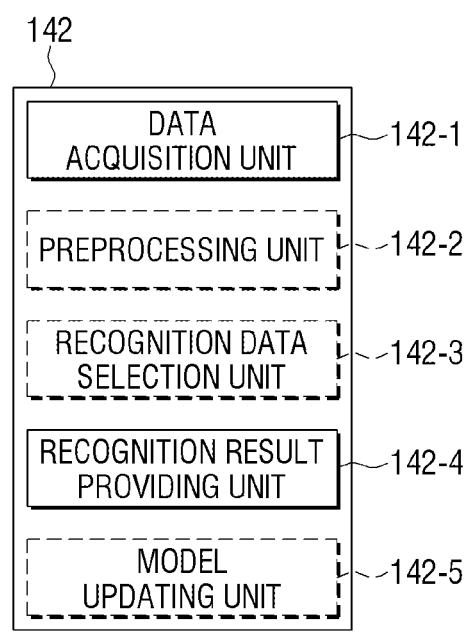
FIG. 4B is a block diagram of a data recognition unit, according to some embodiments of the disclosure.

FIG. 4B is a block diagram of the data recognition unit 142, according to some embodiments of the disclosure. Referring to FIG. 4B, the data recognition unit 142 according to some embodiments may include a data acquisition unit 142-1 and a recognition result providing unit 142-4. In addition, the data recognition unit 142 may further selectively include at least one of a preprocessing unit 142-2, a recognition data selection unit 142-3, and a model updating unit 142-5.

The data acquisition unit 142-1 may acquire data necessary to determine context. The recognition result providing unit 142-4 may apply the selected data to the data recognition model to determine context. The recognition result providing unit 142-4 may provide the recognition result according to the data recognition purpose. The recognition result providing unit 142-4 may apply the selected data to the data recognition model by using the data selected by the recognition data selection unit 142-3 as an input value. In addition, the recognition result may be determined by the data recognition model.

For example, the recognition result providing unit 142-4 may recognize inputted content data or an inputted user utterance according to the classification criteria determined in the data recognition model. In addition, context may be determined based on the recognized content data. In addition, by using the user voice and the information ontology, the processor 140 may determine what task the user intends to perform. As another example, the recognition result providing unit 142-4 may recognize a data keyword in the inputted content data using the data recognition model. In addition, the recognition result providing unit 142-4 may recognize a key word in the inputted user utterance. Based on the data keyword, the processor 140 may generate a time stamp and match the generated time stamp with the data keyword, and determine a candidate task based on the recognized key word.

The data recognition unit 142 may further include the preprocessing unit 142-2 and the recognition data selection unit 142-3 in order to improve an output result of the data recognition model or save time or resources for providing the output result.

The preprocessing unit 141-2 may pre-process acquired data so that the acquired data can be used to determine context. The preprocessing unit 142-2 may process the acquired data into a predetermined format so that the recognition result providing unit 142-4 can utilize the data acquired to determine context.

The recognition data selection unit 142-3 may select data to determine context from the preprocessed data. The selected data may be provided to the recognition result providing part 142-4. The recognition data selection unit 142-3 may select some or all of the preprocessed data according to predetermined criteria for determining context. In addition, the recognition data selection unit 142-3 may select data according to predetermined criteria by learning of the model learning unit 141-4.

The model updating part 142-5 may control the data recognition model to be updated based on an evaluation of a recognition result provided by the recognition result providing part 142-4. For example, the model updating unit 142-5 may provide the model learning unit 141-4 with the recognition result provided by the recognition result providing unit 142-4 so that the model learning unit 141-4 can update the data recognition model.

At least one of the data acquisition unit 142-1, the preprocessing unit 142-2, the recognition data selection unit 142-3, the recognition result providing unit 142-4, and the model updating unit 142-5 in the data recognition unit 142 may be fabricated in the form of at least one hardware chip and mounted on an electronic device. For example, at least one of the data acquisition unit 142-1, the preprocessing unit 142-2, the recognition data selection unit 142-3, the recognition result providing unit 142-4, and the model updating unit 142-5 may be manufactured in the form of a chip exclusively used for hardware for artificial intelligence (AI), in the form of the existing universal processor (for example, CPU or application processor), or as part of IP for a specific function to be mounted on the above-described various electronic devices 100.

The data acquisition unit 142-1, the preprocessing unit 142-2, the recognition data selection unit 142-3, the recognition result providing unit 142-4, and the model updating unit 142-5 may be mounted on a single electronic device or on separate electronic devices, respectively. For example, some of the data acquisition unit 142-1, the preprocessing unit 142-2, the recognition data selection unit 142-3, the recognition result providing unit 142-4, and the model updating unit 142-5 may be included in the electronic device 100 and the rest may be included in the server 200.

Meanwhile, at least one of the data acquisition unit 142-1, the preprocessing unit 142-2, the recognition data selection unit 142-3, the recognition result providing unit 142-4, and the model updating unit 142-5 may be implemented as a software module. If at least one of the data acquisition unit 142-1, the preprocessing unit 142-2, the recognition data selection unit 142-3, the recognition result providing unit 142-4, and the model updating unit 142-5 is implemented as a software module (or a program module including instructions), the software module may be stored in a non-transitory computer readable recording medium. At least one software module may be provided by an operating system (OS) or a predetermined application. Alternatively, part of at least one software module may be provided by an OS, and the remaining part may be provided by a predetermined application.

Figure 4C:
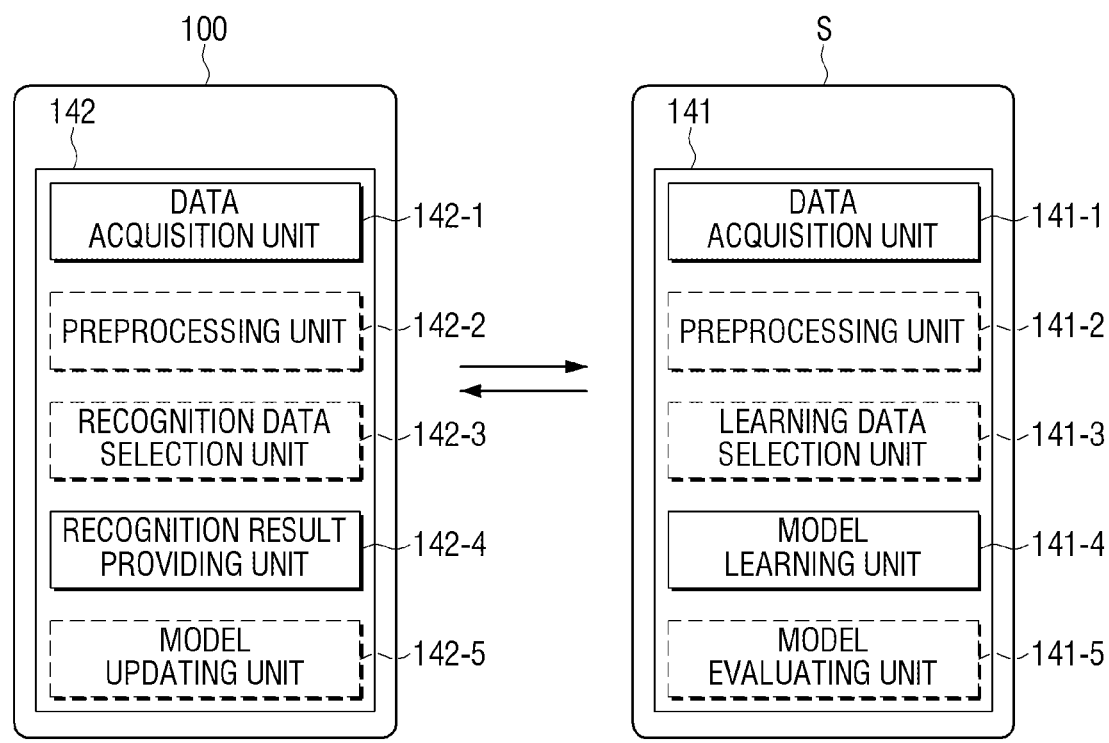
FIG. 4C is a block diagram provided to explain an interlocking operation between an electronic device and an external server, according to some embodiments of the disclosure.

FIG. 4C is a diagram illustrating an example in which the electronic device 100 and an external server S are interlocked with each other to learn data and provide a data recognition result, according to an embodiment of the disclosure.

Referring to FIG. 4C, the external server S may learn a data recognition model for acquiring a keyword from the content data, and the electronic device 100 may provide the data recognition result based on the learning result of the server S.

In this case, the model learning unit 141-4 of the server S may perform a function of the data learning unit 141 illustrated in FIG. 4A. The model learning unit 141-4 of the server S may learn criteria as to how to perform a data recognition.

In addition, the recognition result providing unit 142-4 of the electronic device 100 may apply data selected by the recognition data selection unit 142-3 to a data recognition model generated by the server S, and acquire a data recognition result with respect to the content data. Alternatively, the recognition result providing unit 142-4 of the electronic device 100 may receive from the server S the data recognition model generated by the server S, and generate a data recognition result using the received data recognition model. In this case, the recognition result providing unit 142-4 of the electronic device 100 may apply recognition data selected by the recognition data selection unit 142-3 to the data recognition model received by the server S, and acquire the data recognition result with respect to the content data.

Figure 5:
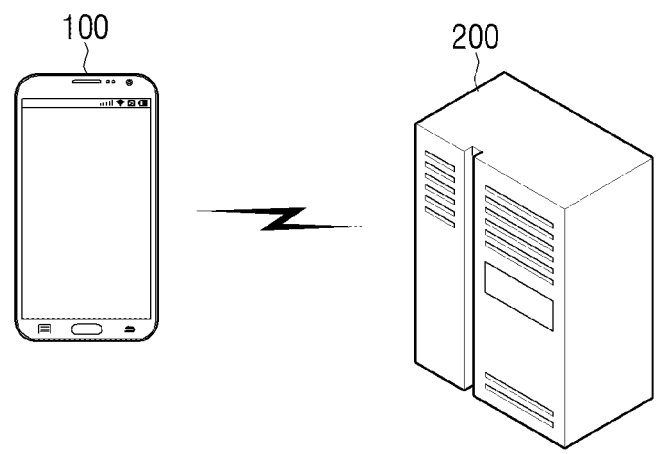
FIG. 5 is a diagram to explain an intelligent retrieval system, according to an embodiment of the disclosure.

FIG. 5 is a diagram to explain an intelligent retrieval system, according to an embodiment of the disclosure.

Referring to FIG. 5, an intelligent retrieval system 1000 may include the electronic device 100 and the server 200.

The electronic device 100 may recognize inputted content data, and understand context of the content data. In addition, the electronic device 100 may recognize a user voice which is uttered by a user and understand the language. The electronic device 100 may provide a corresponding task based on context of the recognized content data or the recognized user voice.

The server 200 may provide information when the electronic device 100 manages the inputted content data or the conversation with the user and generates a response. In addition, the server 200 may provide or update a context model, language model or information ontology used in the electronic device 100. As described above, the electronic device 100 and the server 200 may be interlocked with each other and provide the intelligent retrieval function.

As another example, the electronic device 100 may play only a role of an input/output device that simply receives content data and provides a guide. Alternatively, the electronic device 100 may play only a role of an input/output device that simply receives a user voice and provides a guide. In this case, the server 200 may be implemented to process most of the intelligent retrieval service.

Specific embodiments of the intelligent retrieval service will be described below.

Figure 6:
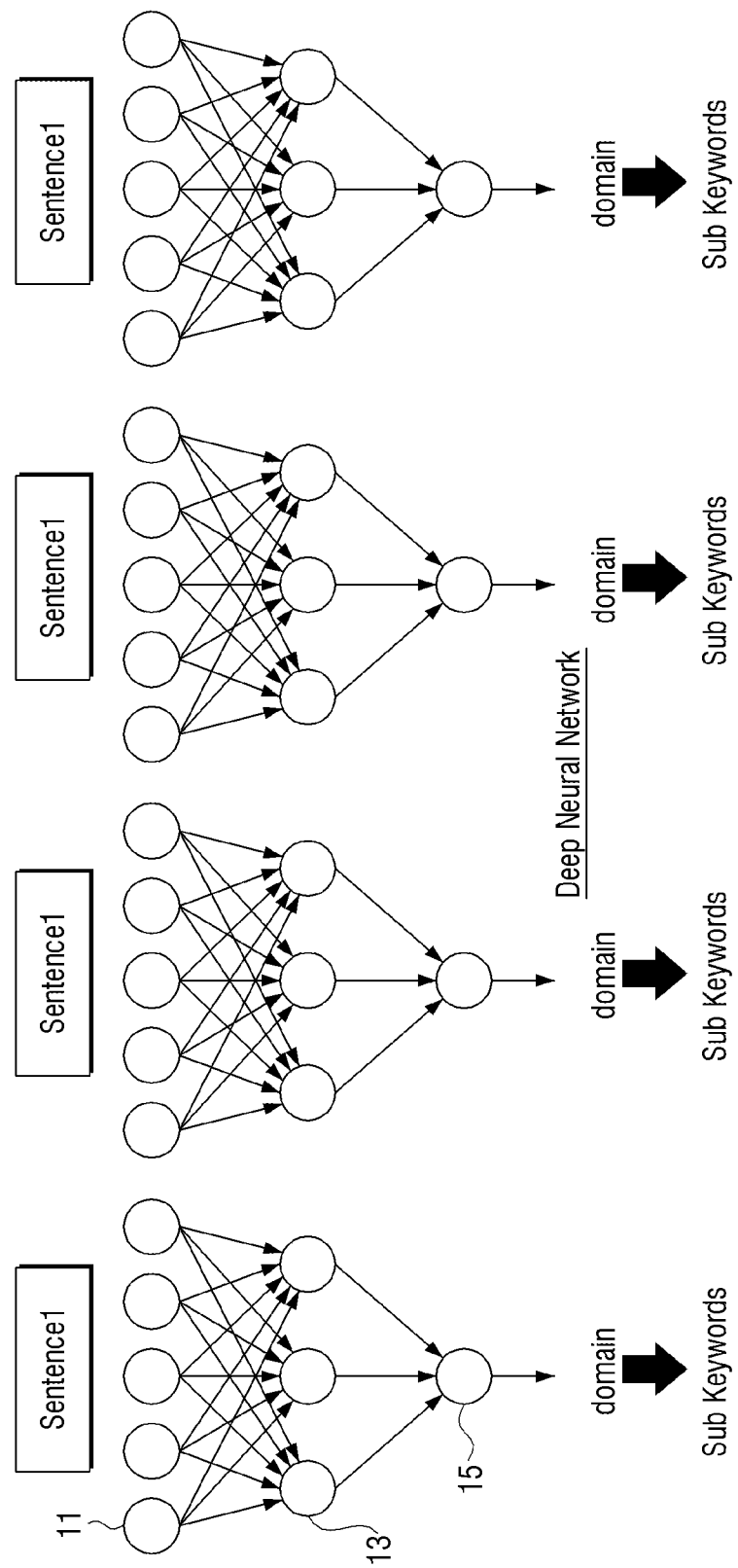
FIG. 6 is a diagram to explain a process of extracting a data keyword, according to an embodiment of the disclosure.

FIG. 6 is a diagram to explain a process of extracting a data keyword, according to an embodiment of the disclosure.

Referring to FIG. 6, a process of extracting sub keywords from a sentence is illustrated. The electronic device 100 receives input of content data. For example, the inputted content data may be audio data. The electronic device 100 may convert the inputted audio data into text data. The electronic device 100 may store the converted text data. That is, the electronic device may convert content data in an audio format into content data in a text format, and store the content data.

The electronic device 100 may divide the content data into sentences. The electronic device 100 may extract first words 11 for each sentence. The electronic device 100 may extract second words 13 by referring to relevancy and context of the extracted first words 11. In addition, a domain keyword 15 may be extracted by referring to the extracted at least one second word 13 and the context. The electronic device 100 may extract sub keywords by referring to the domain keyword 15, the extracted first words 11, the second words 13, etc. For example, the domain keyword may be a key word of the sentence. In addition, the sub keyword may be a word used in a similar environment to the domain keyword, a word used in context in which the domain keyword is used or a word related to the meaning of the domain keyword, a synonym of the domain keyword and another sub keyword, etc.

As described above, a process of extracting a domain keyword and a sub keyword by the electronic device 100 may be performed through a process of machine learning, speech recognition, sentence analysis, context awareness, etc. including deep learning. The electronic device 100 may establish a data recognition model through a process of machine learning, etc., and extract a domain keyword and a sub keyword using the established data recognition model. In addition, the data recognition model may be established in consideration of an application field of the recognition model, an objective of learning, computer performance of the device and the like. The data recognition model may be, for example, a model based on a neural network. For example, models such as Deep Neural Network (DNN), Recurrent Neural Network (RNN) and Bidirectional Recurrent Deep Neural Network (BRDNN) may be used as a data recognition model.

Figure 7:
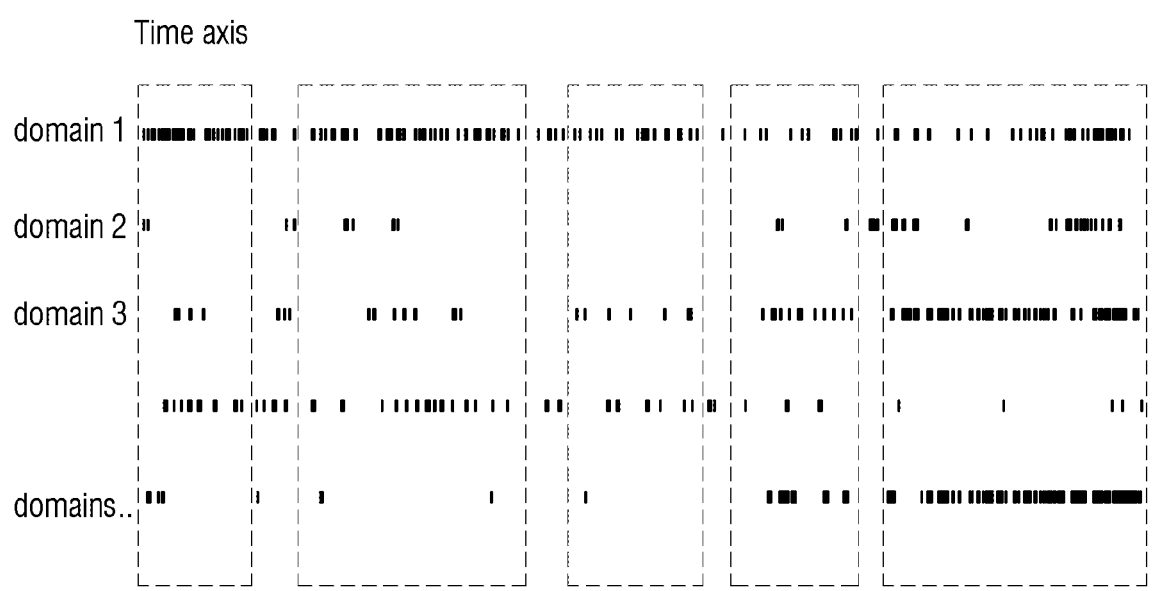
FIG. 7 is a diagram to explain a process of analyzing a data keyword, according to an embodiment of the disclosure.

FIG. 7 is a diagram to explain a process of analyzing a data keyword, according to an embodiment of the disclosure.

Referring to FIG. 7, a diagram illustrating a frequency of domain keyword according to a time axis is illustrated. The content data may be a story about a specific topic, and may include a large number of sentences. In addition, the domain keyword is a key word of the sentences and thus, one content data may include the same domain keywords.

The electronic device 100 may align and analyze the domain keywords according to a time axis. The electronic device 100 may time-group based on a frequency of domain keywords over time. In addition, the extracted key keywords may be tagged.

That is, the electronic device 100 may time-group according to a frequency of domain keywords, and tag domain keywords within a grouped time group and sub keywords related to the domain keywords. For example, the electronic device 100 may determine a first domain keyword as a key keyword in the first time group. In addition, the electronic device 100 may set a start time and duration of the first time group as a time stamp. In addition, at least one sub keyword related to the first domain may be tagged. Meanwhile, sub keywords in the same group may have frequency differences. Accordingly, the electronic device 100 may apply a weight to the sub keywords. For example, a key keyword of the first time group may be a first domain keyword, and sub keywords related to the first domain keyword may be a 1-1 domain keyword and a 1-2 sub keyword, respectively. In addition, when a frequency of the 1-1 sub keyword is 60% and a frequency of the 1-2 sub keyword is 40%, the electronic device 100 may set a weight of 6 to the 1-1 sub keyword and set a weight of 4 to the 1-2 sub keyword.

Alternatively, the electronic device 100 may calculate a distance between a time group, a domain keyword and a sub keyword using a machine learning process. A distance between a domain keyword and a sub keyword may signify a relative relevance between the domain keyword and the sub keyword based on context of the sentence or paragraph. For example, a sub keyword directly related to the first domain keyword may be set to be close to the first domain keyword, and a sub keyword added to the first domain keyword may be set to be far from the first domain keyword. In addition, a distance between keywords may be expressed numerically by numerical value. That is, when a distance between the first domain keyword and the 1-1 sub keyword is 4 and a distance between the first domain keyword and the 1-2 sub keyword is 2, the electronic device 100 may set a weight of 2 to the 1-1 sub keyword and set a weight of 4 to the 1-2 sub keyword. That is, the electronic device 100 may assign a weight to a data keyword based on context of the content data, a frequency of the data keyword or the like.

In addition, the electronic device 100 may extract a time stamp of a part related to the domain keyword and the sub keyword from among the content data. The electronic device 100 may store audio content data, text content data, a topic, a domain keyword, a sub keyword, a weight, a time stamp, etc.

Thereafter, when a user command is inputted, the electronic device 100 may analyze the inputted user command and acquire command keywords. A process of acquiring command keywords by the electronic device 100 may be performed through an artificial intelligence function such as machine learning, speech recognition and context awareness including deep learning. The electronic device 100 may acquire at least one command keyword. In addition, the electronic device 100 may assign a weight to the acquired command keyword. The electronic device 100 may identify a data keyword matched with the command keyword. In addition, the electronic device 100 may calculate a score based on a weight of the identified data keyword and a weight of the command keyword.

The electronic device 100 may identify a data keyword with the highest score based on the calculated score. In addition, the electronic device 100 may play the content data on the basis of a time stamp corresponding to the identified data keyword.

Figure 8:
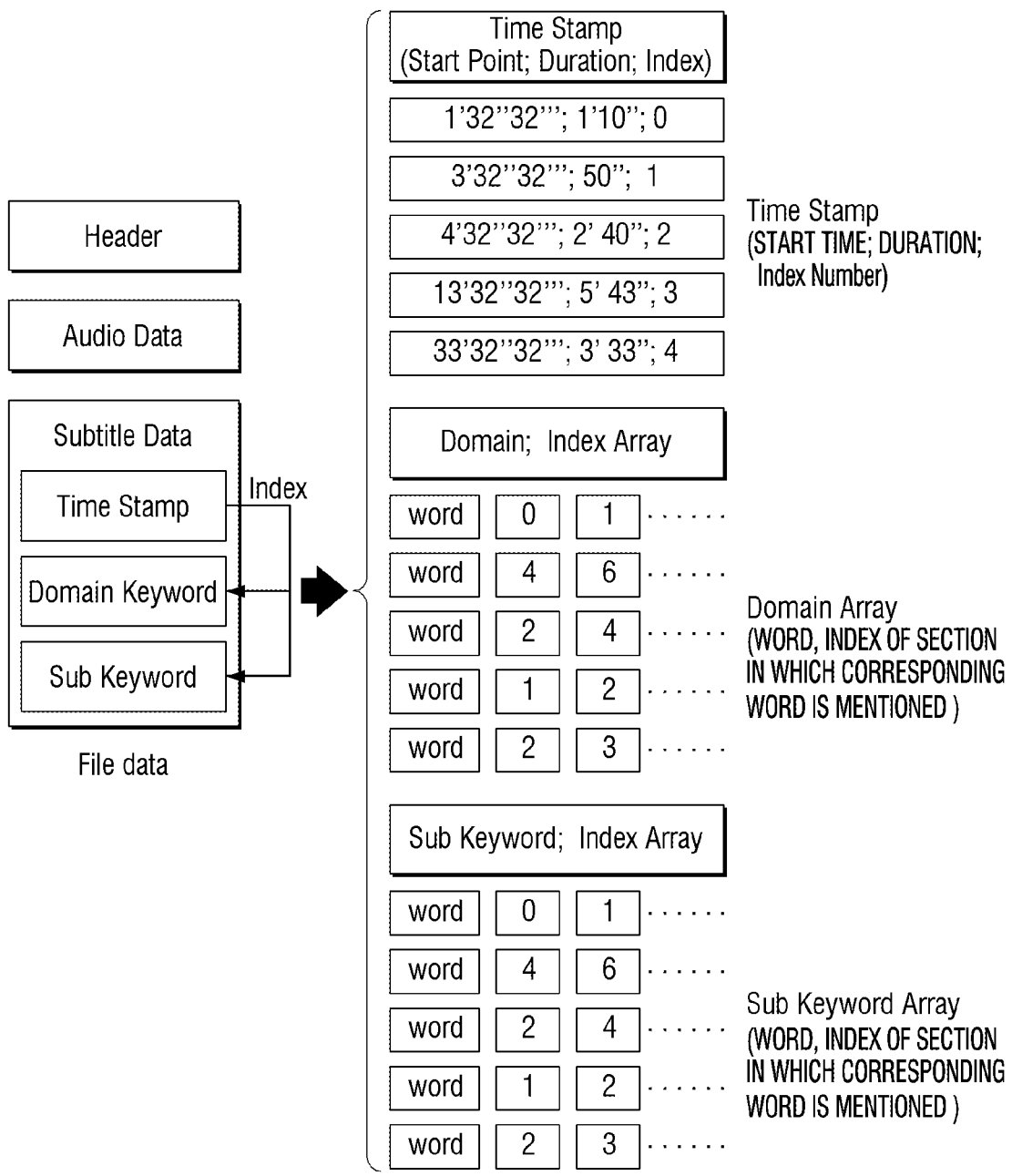
FIG. 8 is a diagram to explain a data keyword to which a time stamp is mapped, according to an embodiment of the disclosure.

FIG. 8 is a diagram to explain a data keyword to which a time stamp is mapped, according to an embodiment of the disclosure.

Referring to FIG. 8, an embodiment of a data structure stored in the electronic device 100 is illustrated. As described above, the electronic device 100 may store content data, a keyword, a time stamp, etc. For example, file data stored in the electronic device 100 may include a header, audio data and subtitle data. The header includes information of the file data. In addition, the audio data refers to content data. In the subtitle data, information such as a domain keyword, a sub keyword, a time stamp, etc. may be stored.

In an embodiment, the time stamp may include a start time, duration and index number of a time group. The start time refers to a time at which the corresponding section from among the entire content data is started. The duration refers to duration of the corresponding section. The index number refers to a serial number of the stored section.

The time stamp may include a domain keyword and a sub keyword. In addition, the domain keyword and the sub keyword may be stored as being tagged with an index number of a stored section in which the corresponding keywords are included. For example, when a first domain keyword is tagged with index numbers 1 and 3, it means that the first domain keyword is included in a time group corresponding to the index numbers 1 and 3. In addition, according to a user command, the electronic device 100 plays content data of the corresponding part on the basis of the keywords and the index numbers.

Meanwhile, the electronic device 100 may display a visual data structure chart to a user based on a stored file structure.

Figure 9:
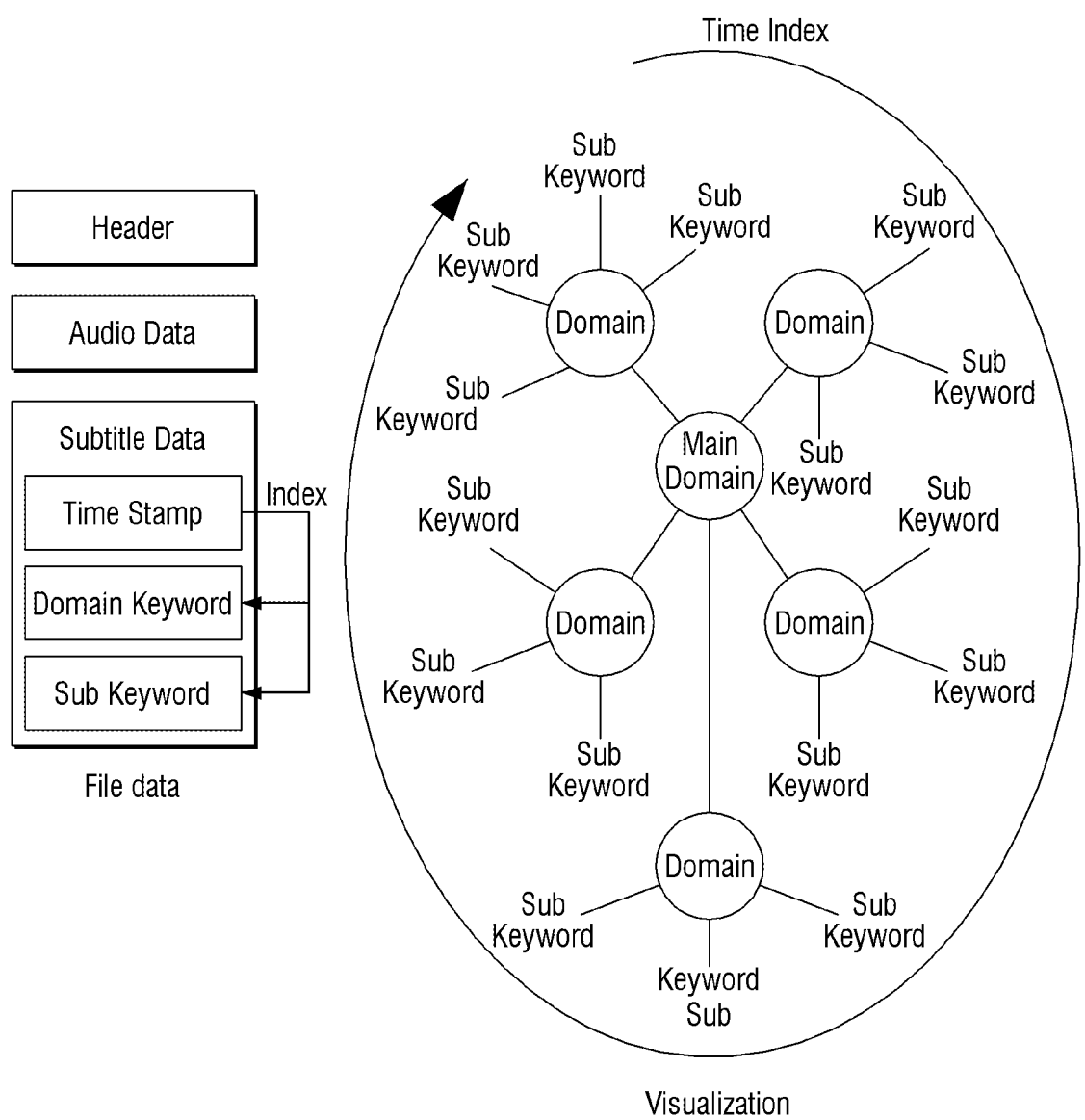
FIG. 9 is a diagram to explain a data keyword represented in a visual chart, according to an embodiment of the disclosure.

FIG. 9 is a diagram to explain a data keyword represented in a visual chart, according to an embodiment of the disclosure.

Referring to FIG. 9, a visual chart is illustrated. A file structure stored in the electronic device 100 is as described in FIG. 8. The electronic device 100 may determine a connection relationship between a domain keyword and a sub keyword. In addition, the electronic device 100 may display the domain keyword and the sub keyword on the display as a visual chart.

As illustrated in FIG. 9, a main keyword, which is a key keyword of the entire content data, may be present. In addition, at least one domain keyword related to the main domain keyword may be present. In addition, each domain keyword may include at least one sub keyword. According to circumstances, the sub keyword may include a second sub keyword as a lower layer.

In an embodiment, the electronic device 100 may display a domain keyword related to the main domain keyword, and display a sub keyword related to the domain keyword. In addition, the electronic device 100 may arrange the domain keyword and the sub keyword in a chronological order while rotating in a clockwise direction with reference to an upper right end. The electronic device 100 may arrange sub keywords within the domain keyword in the same manner. In the manner described above, the electronic device 100 may display a structure of the content data on a visual chart based on the domain keyword and the sub keyword.

Meanwhile, the electronic device 100 may receive input of a user command on the visual chart and perform the corresponding task.

Figure 10:
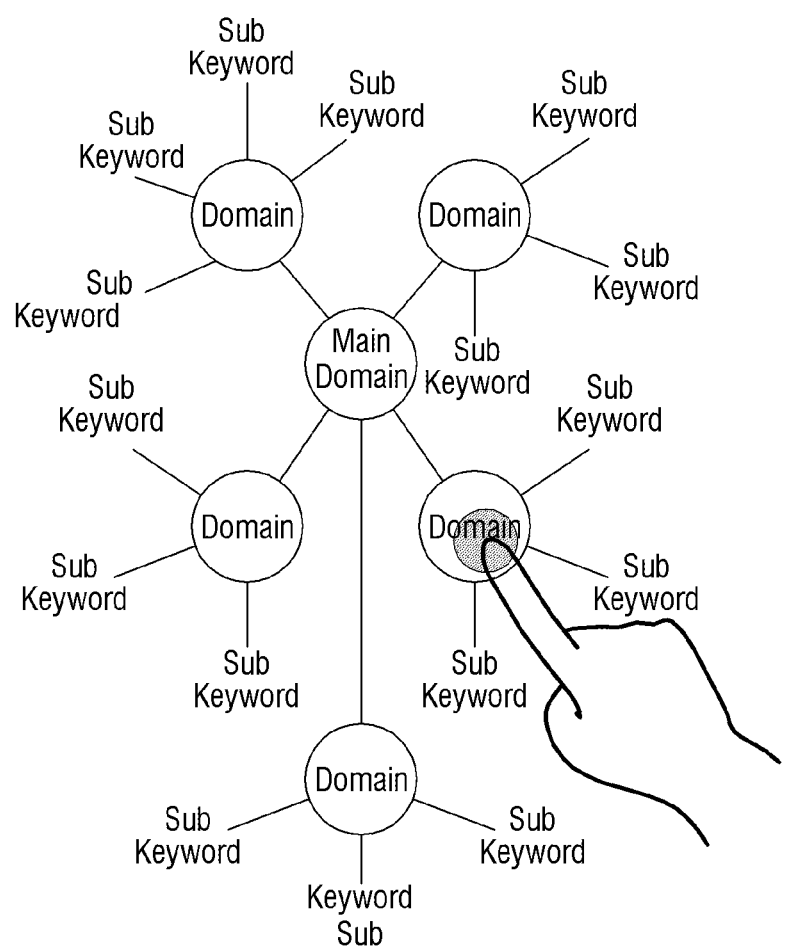
FIG. 10 is a diagram to explain a process of selecting a specific part of content data using a visual diagram, according to an embodiment of the disclosure.

FIG. 10 is a diagram to explain a process of selecting a specific part of content data using a visual chart, according to an embodiment of the disclosure.

Referring to FIG. 10, a diagram in which a user command is received on a displayed domain keyword is illustrated. The electronic device 100 may display a content data structure including a domain keyword and a sub keyword. In addition, the respective domain keywords and sub keywords may receive input of a selection command from a user. When the user selects a first domain keyword, the electronic device 100 may play content data corresponding to the first index number of the selected first domain keyword. Alternatively, when the user selects a first sub keyword of the first domain keyword, the electronic device 100 may play content data corresponding to the first index number of the selected first sub keyword. The electronic device 100 may play the content data on the basis of a time stamp corresponding to the index number.

That is, the electronic device 100 may, when receiving input of a selection command with respect to a data keyword included in the visual chart, play the content data on the basis of a time stamp corresponding to the selected data keyword. Meanwhile, the electronic device 100 may play the content data in a different manner from a voice input of the user and an input method on the visual chart.

Figure 11A:
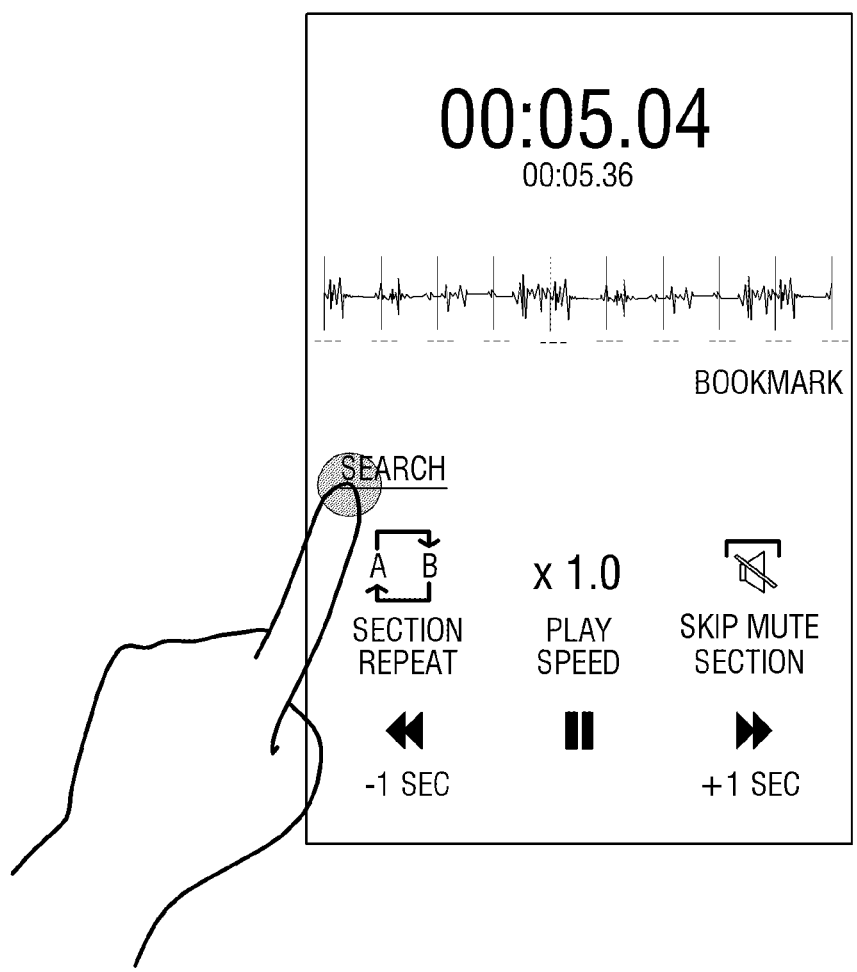
FIG. 11A to 11C are diagrams to explain a process of playing content data through a retrieval function, according to an embodiment of the disclosure.
Figure 11B:
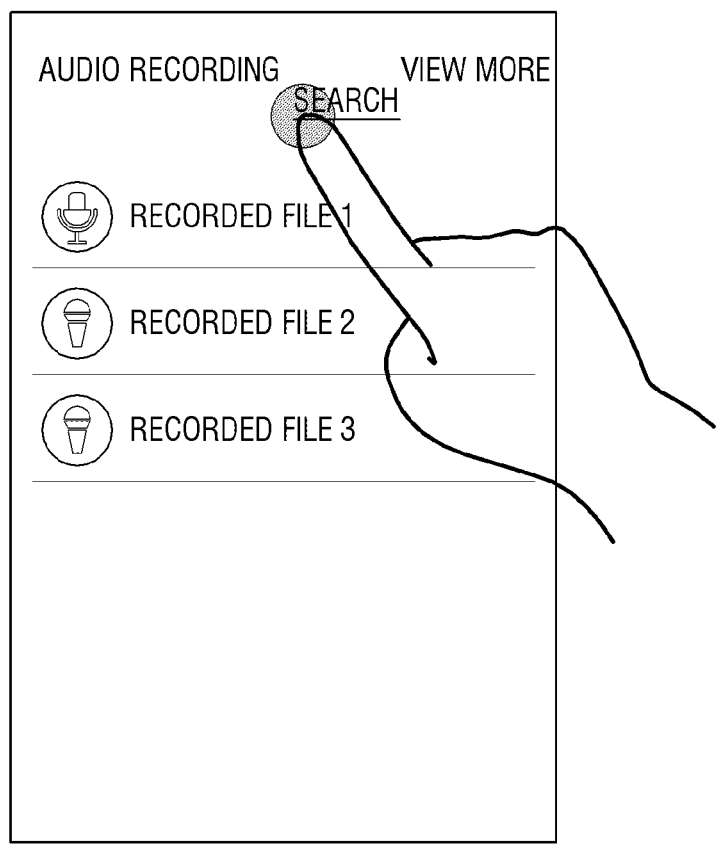
Figure 11C:
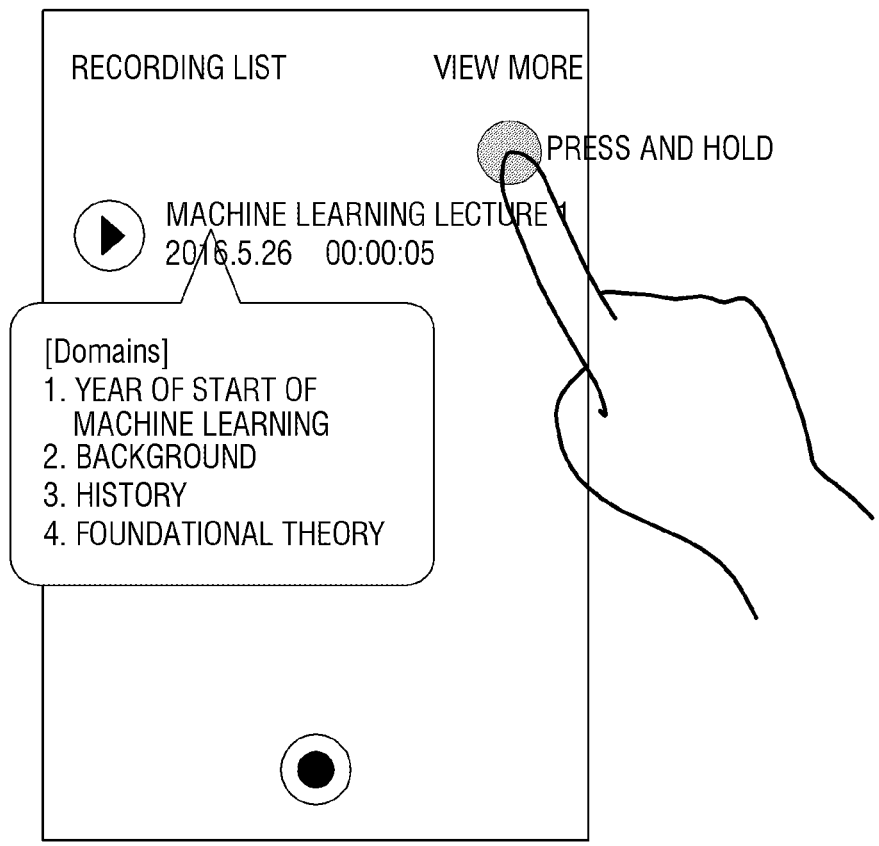

FIG. 11A to 11C are diagrams to explain a process of playing content data through a retrieval function, according to an embodiment of the disclosure.

Referring to FIG. 11A, a screen of the electronic device 100 is illustrated. The electronic device 100 may display a screen to play stored content data. When a general play, rewind, or fast forward button is selected, the electronic device 100 may perform the corresponding task. In addition, the electronic device 100 may include a menu such as section repeat, play speed control, etc., and when a selection command is inputted, perform the corresponding task.

The electronic device 100 may further include a search menu. The electronic device 100 may display a domain keyword of content data when the search menu is selected by the user. Alternatively, the electronic device 100 may perform switching from another screen to a keyword display screen of the content data using the search menu.

Referring to FIG. 11B, the electronic device 100 in which the stored content data is displayed in a list form is illustrated. The electronic device 100 may also display a search menu on a screen in which the content data is displayed in a list form. When the search menu is selected, the electronic device 100 may switch a current screen to a screen to a screen to display a domain keyword of the content data.

Referring to FIG. 11C, the electronic device 100 in which the domain keyword is displayed is illustrated. The electronic device 100 may display a domain keyword list or one domain keyword and sub keyword included therein. When the user inputs a preset command on the displayed screen, the electronic device 100 may play the corresponding content data.

In an embodiment, the electronic device 100 may display a screen related to a specific domain keyword on the basis of a user search. The user may input a touch command on the screen for a long time. The electronic device 100 may play content data corresponding to a domain keyword displayed on the screen.

In the manner described above, the electronic device 100 may easily play content data corresponding to the domain keyword or the sub keyword.

The various embodiments of the electronic device 100 are described above. A control method of an electronic device will be described below.

Figure 12:
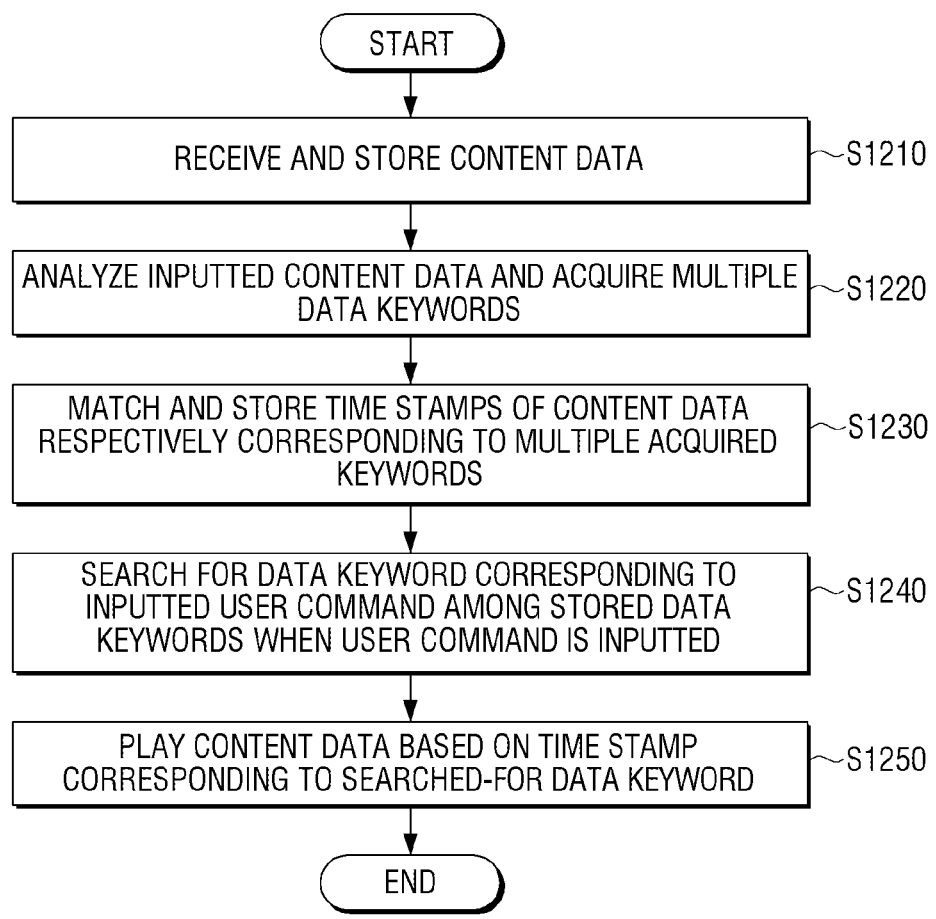
FIG. 12 is a flowchart of a control method of an electronic device, according to an embodiment of the disclosure.

FIG. 12 is a flowchart of a control method of an electronic device, according to an embodiment of the disclosure.

The electronic device receives and stores content data, at operation S1210. For example, the content data may be audio data. In addition, the electronic device may convert the inputted audio data into text data and store the converted text data.

The electronic device analyzes the inputted content data and acquires a plurality of data keywords, at operation S1220. A data keyword may include a domain keyword and a sub keyword. The domain keyword may be a main topic word of sentences included in the content data. The sub keyword may include a word similar to the domain keyword, a word related to the domain keyword, a word included in another sentence related to the domain keyword, or the like. The electronic device may assign a weight to a data keyword based on at least one of context of the content data or a frequency of the data keyword.

The electronic device matches and stores time stamps, of the content data, respectively corresponding to the plurality of acquired keywords, at operation S1230. The electronic device, based on a user command being inputted, searches for a data keyword corresponding to the inputted user command among the stored data keywords, at operation S1240. The electronic device may analyze the user command and acquire a command keyword, and assign a weight to the acquired command keyword. The electronic device may identify a data keyword matched with the command keyword. In addition, the electronic device may calculate a score based on a weight of the identified data keyword and a weight of the command keyword. The electronic device may search for a data keyword with the highest score based on the calculated score.

The electronic device may play the content data on the basis of a time stamp corresponding to the searched data keyword, at operation S1250. Meanwhile, the electronic device may display a structure of the audio data on a visual chart based on the domain keyword and the sub keyword. That is, the electronic device 100 may, when receiving input of a selection command with respect to a data keyword included in the visual chart, play the content data on the basis of a time stamp corresponding to the selected data keyword. Alternatively, the user may select one data keyword through a retrieval function in a stored content data list screen, etc., and the electronic device may play the content data on the basis of a time stamp corresponding to the selected data keyword.

Figure 13:
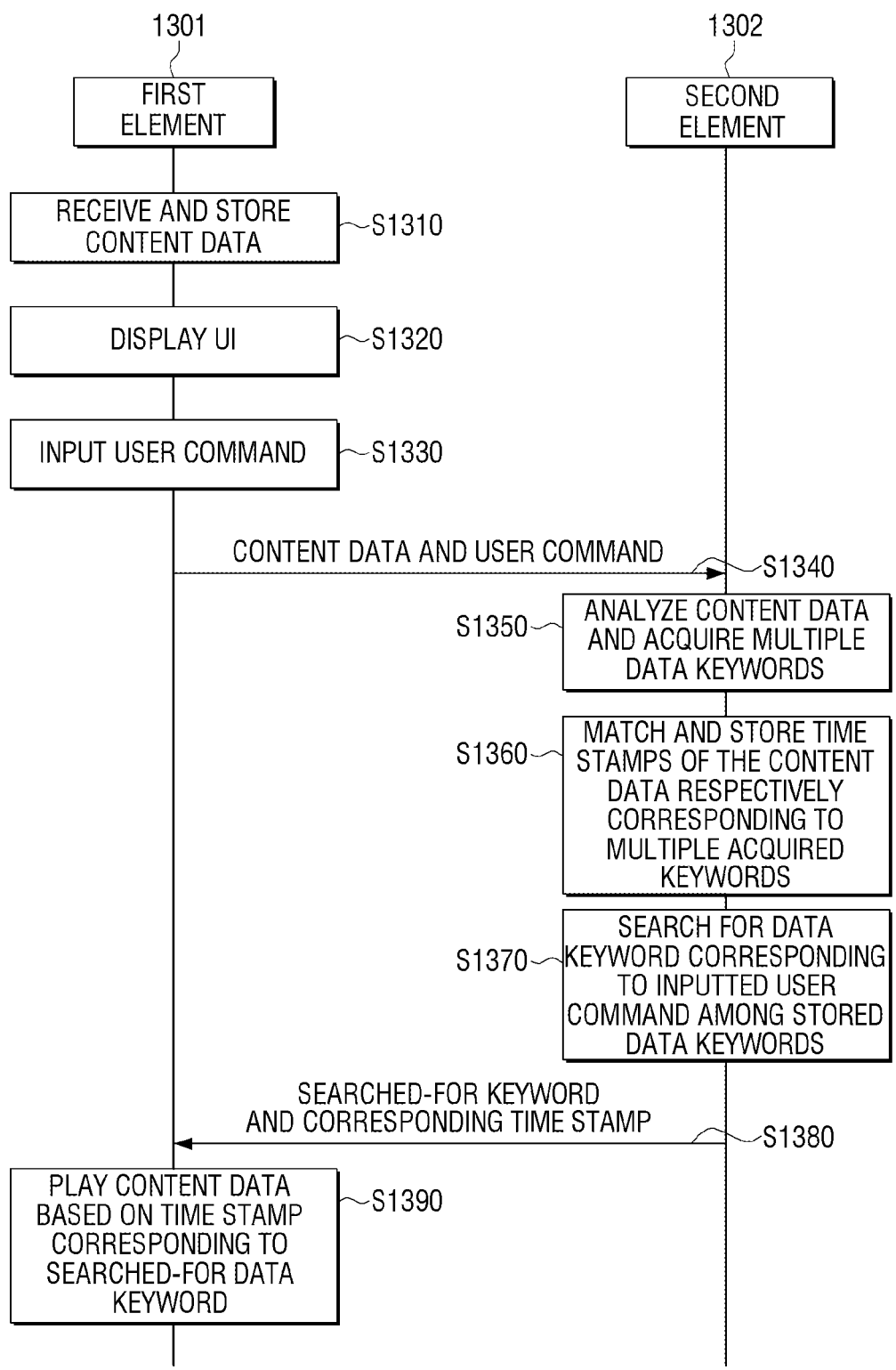
FIGS. 13 and 14 are sequence diagrams of a network system utilizing a data recognition model, according to various embodiments of the disclosure.
Figure 14:
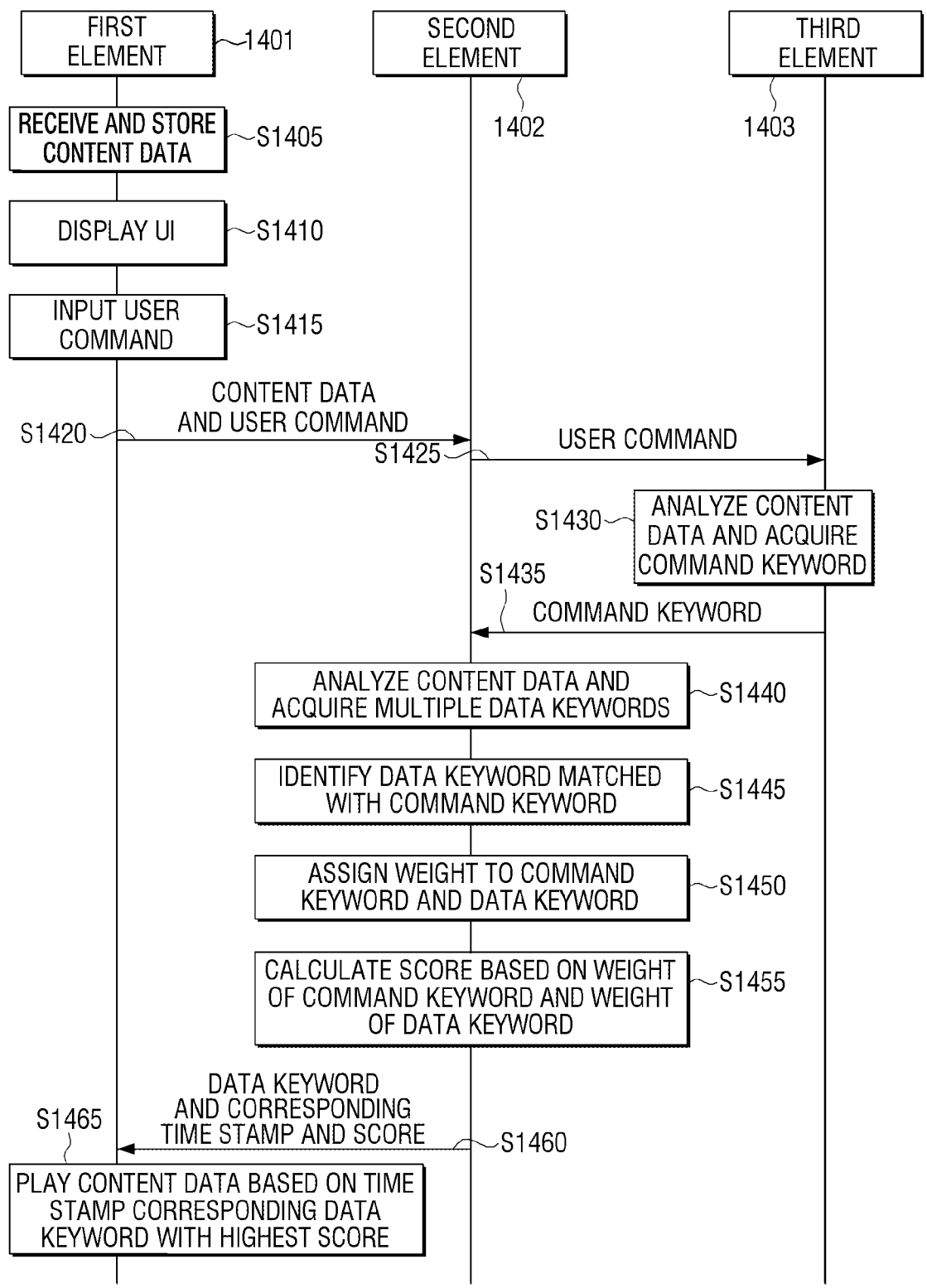

FIGS. 13 and 14 are sequence diagrams of a network system utilizing a data recognition model, according to various embodiments of the disclosure.

In FIGS. 13 and 14, a network system using a learned artificial intelligence model may include at least two of a first element 1301 and 1401, a second element 1302 and 1402, and a third element 1403.

Here, the first element 1301 and 1401 may be the electronic device 100, and the second element 1302 and 1402 may be a server 200 in which a text summary model is stored. Alternatively, the first element 1301 and 1401 may be a universal processor, and the second element 1302 and 1402 may be a processor exclusively used for artificial intelligence. Alternatively, the first element 1301 and 1401 may be at least one application, and the second element 1302 and 1402 may be an operating system (OS). That is, the second element 1302 and 1402 may be an element which is more integrated, dedicated, less delayed, better in performance or with more resources than the first element 1301 and 1401, which is capable of quickly and effectively processing a large number of calculations required to generate, update or apply a document summary model as compared with the first element 1301 and 1401.

In this case, an interface for transmitting and receiving data between the first element 1301 and 1401 and the second element 1302 and 1402 may be defined.

For example, an application program interface (API) having learning data to be applied to the document summary model as a factor value (or intermediation value or transfer value) may be defined. The API may be defined as a set of sub routines or functions that may be called for a certain processing of another protocol (for example, a protocol defined in a server) from any one protocol (for example, a protocol defined in the electronic device 100). That is, through the API, an environment in which a task of another protocol may be performed in any one protocol may be provided.

Meanwhile, the third element 1403 may receive a user command from at least one of the first element 1401 and the second element 1402, and acquire and provide a command keyword from the received user command.

In an embodiment, in FIG. 13, the first element 1301 may receive content data and store it, at operation S1310. In this case, the content data may be data including audio data.

The first element 1301 may display a UI, at operation S1320. In this case, the UI is a UI for searching for a specific point in time of the content data, which may request utterance to the user.

The first element 1301 may receive a user command, at operation S1330. In this case, a user command inputted through the UI may be one of keywords included in the content data. However, the example is not limited thereto, and even a keyword not included in the content data may be extended to a keyword included in the content data in the second element 1302 which will be described later.

The first element 1301 may transmit the content data and the user command to the second element 1302, at operation S1340.

The second element 1302 may analyze the content data and acquire a plurality of data keywords. Specifically, the second element 1302 may acquire a plurality of data keywords from the content data on the basis of a learned data recognition model.

The second element 1302 may match and store time stamps, of the content data, respectively corresponding to the plurality of acquired keywords, at operation S1360.

In addition, the second element 1302 may search for a data keyword corresponding to the user command among the stored data keywords, at operation S1370. Here, the data keyword corresponding to the user command may include not only the same data keyword as the user command, but also a data keyword related to the user command.

The second element 1302 may transmit the searched-for keyword and the corresponding time stamp, at operation S1380.

The first element 1301 may play the content data based on the time stamp corresponding to the searched data keyword, at operation S1390.

In another embodiment, in FIG. 14, the first element 1401 may receive content data and store it, at operation S1405, and display a UI, at operation S1410. In addition, the first element 1401 may receive a user command through the UI, at operation S1415, and transmit the content data and the user command to the second element 1402, at operation S1420. Operations S1405 through S1420 of FIG. 14 correspond to those of operations S1310 through S1340 of FIG. 13, and thus their repeated descriptions are omitted.

The second element 1402 may transmit the user command to the third element 1403, at operation S1425.

The third element 1403 may analyze the user command and receive a command keyword, at operation S1460. For example, the third element 1403 may extract nouns included in the user command, and acquire a command keyword corresponding to the user command on the basis of a learned user command analysis model from among the extracted nouns. Here, the user command analysis model is a model which is learned by the third element 1403, and the third element 1403 may learn a user command analysis model capable of deriving the most suitable command keyword from the user command, and update the user command analysis model on the basis of the usage of the extracted command keyword.

The third element 1403 may transmit the command keyword to the second element 1402, at operation S1435.

The second element 1402 may analyze the content data and acquire a plurality of data keywords, at operation S1440, and identify a data keyword matched with the command keyword, at operation S1445.

In addition, the second element 1402 may assign a weight to the command keyword and the data keyword, at operation S1450. For example, the second element 1402 may assign a weight to the data keyword on the basis of a frequency of the data keyword within the content data. In addition, the second element 1402 may assign a weight to the command keyword on the basis of the degree of matching of the command keyword and the data keyword. That is, the second element 1402 may assign a higher weight when the command keyword is completely identical to the data keyword as compared with when the data keyword is not identical to the command keyword but is related.

In addition, the second element 1402 may calculate a score on the basis of a weight of the command keyword and a weight of the data keyword, at operation S1455, and transmit the data keyword and the corresponding time stamp and score to the first element 1401, at operation S1460.

The first element 1401 may play the content data based on the time stamp corresponding to a data keyword with the highest score. However, the example is not limited thereto, and the first element 1401 may play the content data based on the time stamp corresponding to the data keyword with the highest score, and provide on one side another data keyword that does not have the highest score. In this case, the user may select one of other data keywords that correspond to his or her intent, and control the content data to be played based on a time stamp corresponding to the selected another data keyword. In this case, the first element 1401 may provide changed play information to the second element 1402 and the third element 1403, and the second element 1402 and the third element 1403 may respectively update the data recognition model and the user command analysis model on the basis of the received information.

The control method of the electronic device may be implemented as a program and stored in a non-transitory computer readable medium.

The non-transitory computer readable medium refers to a medium which semi-permanently stores data and is machine-readable, rather than a medium that stores data for a short time, such as a register, cache, memory or the like. Specifically, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like, but is not limited thereto.

In addition, although the foregoing embodiments illustrate and describe preferred embodiments, the present disclosure is not limited to the specific embodiments described above, and various modifications and variations by a person skilled in the art to which the present invention pertains is possible without extending beyond the gist of the present disclosure, and these modifications and variations are not to be construed individually from the technical idea or vision of the present disclosure.

The invention claimed is:

1. An electronic device, comprising:
a memory configured to store information on content data; and
a processor configured to:
acquire a plurality of data keywords based on a context associated with the content data by analyzing the inputted content data,
match and store time stamps, of the content data, respectively corresponding to the plurality of acquired data keywords,
based on a user command being inputted, acquire a command keyword,
identify a data keyword matched with the command keyword,
assign a weight to the command keyword,
assign a weight to the identified data keyword on the basis of at least one of the context of the content data or a frequency of the data keyword,
search for a data keyword corresponding to the inputted user command from among the stored data keywords based on the weight of the identified data keyword and the weight of the command keyword, and
play the content data based on the time stamp corresponding to the searched data keyword.

2. The electronic device as claimed in claim 1, wherein searching for the data keyword calculates a score on the basis of the weight of the identified data keyword and the weight of the command keyword, and searches for a data keyword having the highest score on the basis of the calculated score.

3. The electronic device as claimed in claim 1, wherein each of the plurality of data keywords includes a domain keyword and a sub keyword.

4. The electronic device as claimed in claim 3, wherein the domain keyword includes a main topic word of sentences included in the content data.

5. The electronic device as claimed in claim 3, wherein the sub keyword includes at least one of a similar word of the domain keyword, a related word of the domain keyword, and a word included in another sentence related to the domain keyword.

6. The electronic device as claimed in claim 3, further comprising:
a display for displaying a structure of the content data in a visualization chart on the basis of the domain keyword and the sub keyword.

7. The electronic device as claimed in claim 6, wherein the processor, if a selection command with respect to a data keyword included in the visualization chart is inputted, plays the content data on the basis of a time stamp corresponding to the selected data keyword.

8. A control method of an electronic device, the control method comprising:
receiving and storing content data;
analyzing the content data so as to acquire a plurality of data keywords based on a context associated with the content data;
matching and storing time stamps, of the content data, respectively corresponding to the plurality of acquired data keywords;
based on a user command being inputted, acquiring a command keyword,
identifying a data keyword matched with the command keyword,
assign a weight to the command keyword,
assign a weight to the identified data keyword on the basis of at least one of the context of the content data or a frequency of the data keyword
searching for a data keyword corresponding to the inputted user command from among the store data keywords based on the weight of the identified data keyword and the weight of the command keyword; and
playing the content data based on the time stamp corresponding to the searched data keyword.

9. The control method of the electronic device as claimed in claim 8, wherein the searching for the data keyword comprises calculating a score on the basis of the weight of the identified data keyword and the weight of the command keyword, and searching for a data keyword having the highest score on the basis of the calculated score.

10. The control method of the electronic device as claimed in claim 1, wherein each of the plurality of data keywords includes a domain keyword and a sub keyword.

11. The control method of the electronic device as claimed in claim 10, wherein the domain keyword includes a main topic word of sentences included in the content data.

12. The control method of the electronic device as claimed in claim 10, wherein the sub keyword includes at least one of a similar word of the domain keyword, a related word of the domain keyword, and a word included in another sentence related to the domain keyword.

13. The control method of the electronic device as claimed in claim 10, further comprising displaying a structure of the content data in a visualization chart on the basis of the domain keyword and the sub keyword.

* * * * *